Dec. 23, 1969 R. H. PREWITT 3,485,466

ROTARY WING DEVICE

Filed Dec. 27, 1966 10 Sheets-Sheet 1

INVENTOR
RICHARD H. PREWITT

BY Frank C. Leach Jr.

HIS ATTORNEY.

Dec. 23, 1969 R. H. PREWITT 3,485,466

ROTARY WING DEVICE

Filed Dec. 27, 1966 10 Sheets-Sheet 2

INVENTOR
RICHARD H. PREWITT

BY Frank C. Leach Jr.

HIS ATTORNEY.

INVENTOR
RICHARD H. PREWITT
BY Frank C. Leach Jr.,
HIS ATTORNEY.

INVENTOR
RICHARD H. PREWITT

BY Frank C. Leach Jr.

HIS ATTORNEY.

INVENTOR.
RICHARD H. PREWITT
BY Frank C. Leach Jr.
HIS ATTORNEY

INVENTOR.
RICHARD H. PREWITT
BY Frank C. Leach Jr.
HIS ATTORNEY

INVENTOR.
RICHARD H. PREWITT
BY Frank C. Leach Jr.
HIS ATTORNEY

INVENTOR.
RICHARD H. PREWITT
BY Frank C. Leach Jr.
HIS ATTORNEY

INVENTOR.
RICHARD H. PREWITT

BY Frank C. Leach Jr.

HIS ATTORNEY.

INVENTOR.
RICHARD H. PREWITT
BY Frank C. Leach Jr.
HIS ATTORNEY

United States Patent Office 3,485,466
Patented Dec. 23, 1969

3,485,466
ROTARY WING DEVICE

Richard H. Prewitt, 304 W. 3rd St.,
Lexington, Ky. 40508

Filed Dec. 27, 1966, Ser. No. 604,753
Int. Cl. B64d 1/08, 19/02
U.S. Cl. 244—138 30 Claims

ABSTRACT OF THE DISCLOSURE

A gliding rotary wing device includes a body having rotor blades rotatably mounted thereon. The body has rudder means connected thereto to directionally stabilize the body. The rudder means is controlled by suitable means in accordance with directional changes in the body relative to its initial glide direction.

This invention relates to a rotary wing device and, more particularly, to a rotary wing device that permits the dropping of personnel and/or articles from an aircraft flying at a relatively low altitude.

The delivery of personnel and/or articles from an aircraft to a selected target area is most important to military operations. If the load should miss the selected target area, then the personnel and/or articles may be captured by the enemy. There also is the possibility of a large amount of time being lost if a load is not dropped within the selected target area in order to permit formation of the military units or collection of the supplies that have been dropped.

It is important that the load be dropped from as low an altitude as possible from the aircraft. This minimizes the effect of the enemy firepower on the dropped load, and this is particularly important when personnel are being dropped.

Various means have been employed to drop personnel and/or articles from an aircraft to the ground. However, these means have either required dropping from a relatively high altitude and/or have been incapable of permitting the load to be dropped in a pre-selected target area. Other systems have required special ground equipment or have created potential damage to the load when the load engages the ground.

One means for dropping a load from an aircraft has been to employ a parachute. However, a parachute requires a load to be dropped from a relatively high altitude without adequate control. Thus, the lowest safe altitude for dropping a load with a parachute is 1,000 feet and the desired altitude is at least 1,500 feet. Thus, the load is subjected to enemy firepower for an undesirable length of time.

Furthermore, the dropping of the load from a relatively high altitude reduces the opportunity of the load landing in the target area. There is inadequate or no guidance of the dropped load when using a parachute for dropping articles so that sudden wind gusts or the like may cause the load to miss the target area by a large distance. Even when personnel jump from an aircraft, there is only a small amount of guidance available through manuevering the ordinary parachute.

Another problem in dropping loads by parachute is the high rate of vertical descent. The speed of vertical descent of a parachute jumper is equivalent to the vertical speed of ground contact when jumping from a 7½ feet pedestal. Thus, when using a parachute for dropping articles, damage is likely to occur to the load when it contacts the ground unless weighty and expensive shock absorbing structure is employed to absorb the shock to the load.

Another means of delivering a load from an aircraft to the ground has been to utilize ground equipment such as arresting gear, for example. However, it is not always feasible or practical, particularly when operating close to the enemy, to make the necessary ground installations. Furthermore, the ground installation is preferably oriented so that the aircraft, which is dropping the load, can fly upwind at the instant of release to reduce the ground speed at the time of release. Thus, the ground equipment must be specifically positioned in order to produce the desired result.

Another means for dropping a load from an aircraft has been to employ a rotary wing device utilizing the gyroplane or "autogyro" principle in place of a parachute. However, while the theoretical gyroplane principle permits gliding of the device in a controlling path at a rate of vertical descent of about half that of a parachute with an equivalent diameter for the same load, the previously used rotary wing devices employing the gyroplane principle have not been successful because of the tendency of the rotary wing device to have spiral instability.

Spiral instability results from the unsymmetrical lift on the blades on opposite sides of the rotor causing a non-symmetrical flapping of the blades. When the unsymmetrical flapping of the rotor blades occurs, the rotary wing device tends to sid slip in the direction of tilt of the rotor. Furthermore, because the center of the fin area, which is the total of all areas of the rotary wing device or gyroplane that would create a side load on the rotary wing device when the rotary wing device is in a side slip, is back of the center of the rotor, the rotary wing device starts to turn in the direction of rotor tilt to create further spiral instability.

Spiral instability is created by the de-stabilizing moment, which the rotor transmits to the rotary wing device. With the de-stabilizing moment from the rotor always present because of the unsymmetrical lift on the blades on opposite sides of the rotor, the rotary wing device gets into an ever tightening spiral glide until the rotor plane is at an angle substantially 90° to its proper position. At this time, the rotary wing device is descending rapidly until it strikes the ground and is usually destroyed.

The present invention satisfactorily solves the spiral instability problem of the rotary wing device by causing the blades to flap substantially directly fore and aft and by directionally stabilizing the device during its descent. When the rotary wing device is made to glide in a substantially straght line, any unsymmetrical lateral moments generated by unsymmetrical lateral blade flapping, including fore and aft torque moments in the blades, causes an appropriate crabbing or side slip flight of the device. In this condition of flight, the air flow over the rotor disk is no longer directly fore and aft. The air flow comes skewed to one side depending upon the direction of crab. When this happens, the blades are caused to flap higher on the side toward the side slip to thereby restore the equilibrium of the rotary wing device. In this manner, the rotary wing device is made laterally stable so as to prevent any tendency toward spiral instability. Thus, the present invention permits the theoretical advantage of the controlled glide path of the rotary wing device due to the gyroplane principle at a relatively low rate of vertical descent in comparison with that of a parachute.

The present invention permits the load to be dropped from the aircraft at a relatively low altitude whereby the target area may be quite limited and still be hit by the load. Thus, when using the rotary wind device of the present invention, the release at low altitude from the aircraft permits better aiming at the target area and reduces the amount of time that the load is exposed to enemy fire.

The present invention utilizes the kinetic energy involved when the translational speed of the rotary wing device is reduced from that of the aircraft at the time of ejection from the aircraft to that of a gliding gyroplane. This results in the rotary wing device climbing above the load after the load has been ejected from the aircraft. The climbing of the rotary wing device above its load permits extremely low level drops of a load from an aircraft since the rotary wing device is controlling the descent of the load shortly after its ejection or dropping from the aircraft.

The rotary wing device of the present invention has its rotor blades controlled to reduce both the ground speed of the load and the vertical rate of descent of the load to substantially zero when the load contacts the ground. This is accomplished by flaring the rotor blades just prior to the load engaging the ground. The kinetic energy, created by horizontal movement of the load, is transferred into additional lift through flaring of the rotor blades.

Accordingly, by reducing both the rate of vertical descent and the horizontal ground speed, the load contacts the ground at such a relatively slight impact that no type of special cushioning equipment or pallets, for example, is required. Furthermore, the flaring of the rotor blades to reduce the vertical rate of descent by increased blade pitch also decreases the speed of the rotor blades so that the damage, if any, to the rotor blades upon contact with the ground is reduced to such an extent that the rotor blades may be again used. Of course, this use of the blades again would normally only be possible during training purposes.

An object of this invention is to provide a rotary wing device to permit dropping of personnel and/or articles from an aircraft at a relatively low altitude.

Another object of this invention is to provide a rotary wing device of the gyroplane type in which the glide path is stabilized and controlled.

A further object of this invention is to provide a rotary wing device for supporting loads dropped from aircraft so that the horizontal speed of the load relative to the ground is stopped before the load contacts the ground and the load also is directionally stabilized so that it is heading in the direction of glide.

Still another object of this invention is to provide a rotary wing device that allows an attached load to engage the ground at a relatively low vertical speed of descent.

Other objects of this invention will be readily perceived from the following description.

This invention relates to a rotary wing device including a body, rotor blades, and means rotatably mounting the rotor blades on the body. The body has rudder means connected thereto to directionally stabilize the body. The rudder means is controlled by suitable means in accordance with the position of the body with respect to the vertical and azimuth.

This invention also relates to a rotary wing device for supporting a load dropped from an aircraft or the like. The device includes a body, rotor blades, and means rotatably mounting the rotor blades on the body. Suitable means, adapted to be attached to the load, control the pitch of the blades when the load approaches the ground whereby the pitch of the blades is changed by tilting the rotor relative to the body to reduce the horizontal speed of the rotary wing device and the load. Collective blade pitch change is also provided to reduce the vertical velocity of the body and the rotor speed of rotation.

The attached drawings illustrate preferred embodiments, in which

Figure 1:
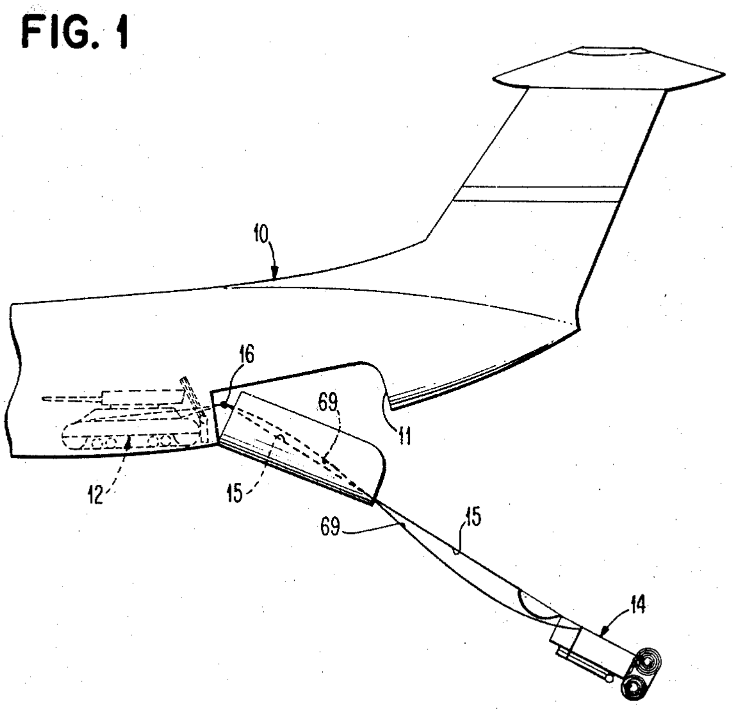
FIGURE 1 is a schematic side elevational view of a portion of an aircraft and showing the rotary wing device of the present invention after it has been ejected from the aircraft.

Referring to the drawings and particularly FIGURE 1, there is shown an aircraft 10 having an opening 11 through which personnel and/or articles may be ejected. A load 12 such as a tank is shown disposed within the aircraft 10.

A rotary wing device 14, which is connected to the load 12, is shown as already having been ejected from the aircraft 10 through the opening 11. The rotary wing device 14 has one end of a main cable 15 connected thereto. The cable 15 has its other end connected to a ring 16. The ring 16 is connected to the load 12 by a pair of forward cables (one shown at 17 in FIGURES 4 to 7) and two aft cables (one shown at 18 in FIGURES 4 to 7).

Figure 8:
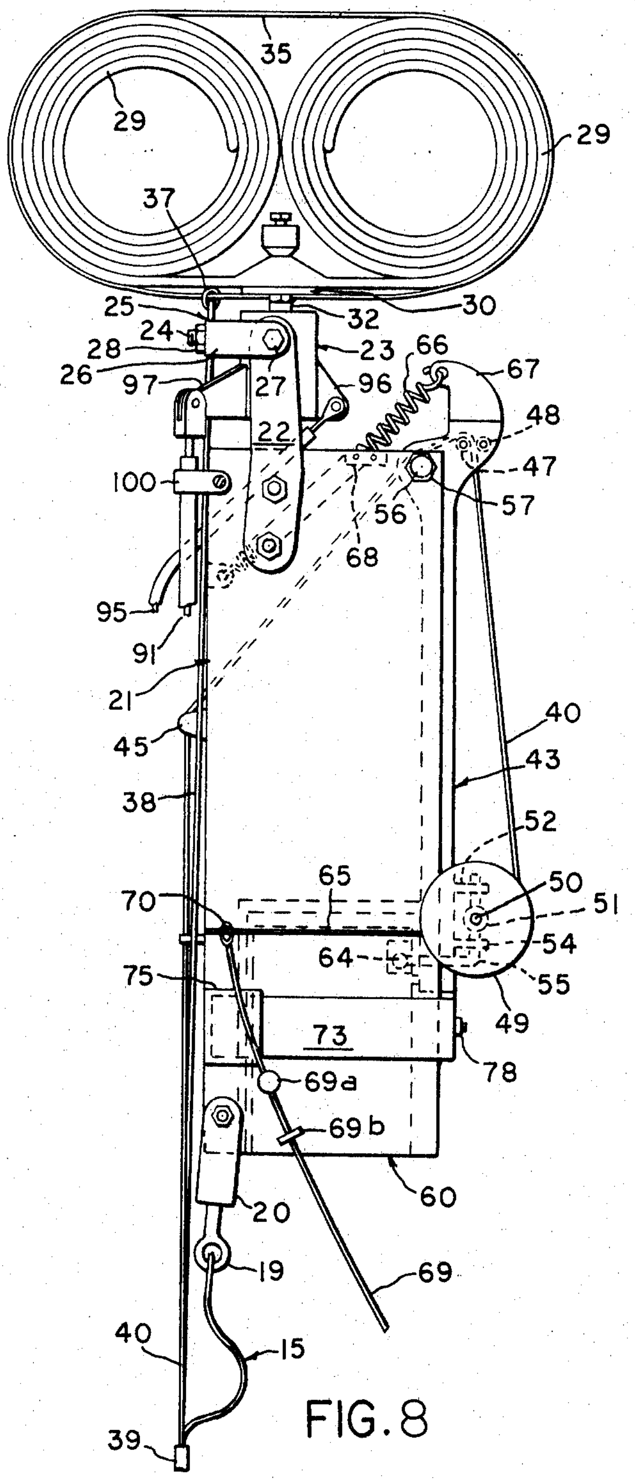
FIGURE 8 is a side elevational view of the rotary wing device of the present invention used in dropping articles from an aircraft.
Figure 9:
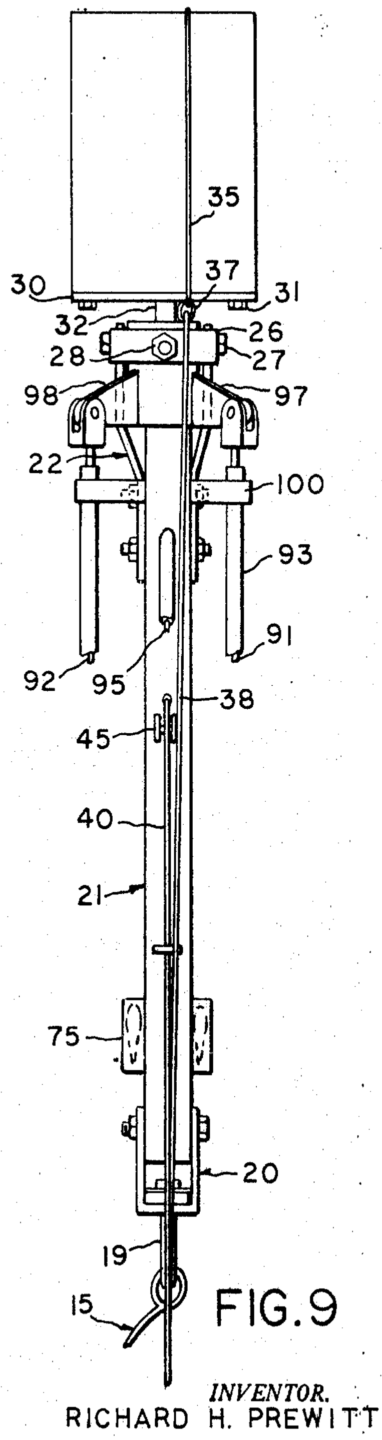
FIGURE 9 is a front elevational view of the rotary wing device of FIGURE 8.

As shown in FIGURES 8 and 9, the cable 15 is attached to an eye bolt 19 of a U-shaped bracket 20, which is pivotally mounted at the bottom of a U-shaped frame 21. The frame 21 forms the body of the rotary wing device 14.

A pair of pylon arms 22 (see FIGURE 9) extends upwardly from opposite sides of the U-shaped frame 21 to gimbally support a rotor hub 23. The hub 23 has a forwardly extending arm 24, which extends through an opening in a yoke 25. The arm 24 is free to rotate within the yoke 25.

The yoke 25 has a pair of rearwardly extending arms 26, which are pivotally connected to the pylon arms 22 through a bolt 27. The arms 26 of the yoke 25 and the pylon arms 22 are pivotally joined by the bolt 27 and a nut 27'. A nut 28 pivotally retains the arm 24 of the hub 23 in connection with the yoke 25. Accordingly, the hub 23 is gimbally mounted with respect to the frame 21.

A pair of rotor blades 29 is rotatably mounted on the rotor hub 23. The rotor blades 29 are attached to a hub attachment plate 30 by bolts 31.

A hollow shaft 32 extends downwardly from the hub attachment plate 30 and rotates in upper and lower ball bearings 33 and 34 (see FIGURE 19), which are disposed within the hub 23. Accordingly, the rotor blades 29 are rotatably mounted with respect to the frame 21 of the rotary wing device 14.

The rotor blades 29 are held in a coiled or inoperative position by suitable means such as a cord 35 (see FIGURE 8). Any suitable type of coiled rotor blades may be employed such as those shown in my U.S. Patent No. 2,614,636. Furthermore, any other type of rotor blade that may be moved from an inoperative to an operative position may be utilized. Additionally, the rotor blades 29 could be originally disposed in the operative position rather than coiled in the inoperative position if sufficient space were available within the aircraft 10.

Due to the flapping of the blades 29 when they are in their operative position and the mounting of the blades 29 to the hub 23 as well as the aerodynamics and dynamics of the blades 29, the rotor system tends to create a nose up moment in forward flight that increases in magnitude with increasing speed. Accordingly, the pivot axis of the arms 26 of the yoke 25 on the pylon arms 22 is disposed slightly ahead of the center line of rotation of the hollow shaft 32. This arrangement insures that the rotary wing device 14 will glide at a predetermined glide speed depending upon the distance of the pivot axis of the yoke 25 on the pylon arms 22 from the centerline of rotation of the hollow shaft 32.

The cord 35, which retains the blades 29 in their inoperative position, is wrapped around the two blades 29 and the hub attachment plate 30 and is tied together at its ends. A ring 37 (see FIGURE 9) is disposed on the cord 35 before the ends are tied together. The ring 37 has its inner surface V-shaped so that downward movement of the ring 37 results in the cord 35 being cut to permit the coiled blades 29 to be moved to their operative position.

One end of a cable 38 is attached to the ring 37 while its other end is attached to the main cable 15 to 39. The main cable 15 is formed with a loop or slack portion between the connection 39 of the cable 38 and the connection of the cable 15 to the eye bolt 19.

Accordingly, when the rotary wing device 14 is ejected from the aircraft 10 as shown in FIGURE 1, the cable 38 will pull on the ring 37 before the cable 15 assumes its total length due to the loop or slack portion in the cable 15 as shown in FIGURE 8. This results in the ring 37 cutting the cord 35.

Figure 10:
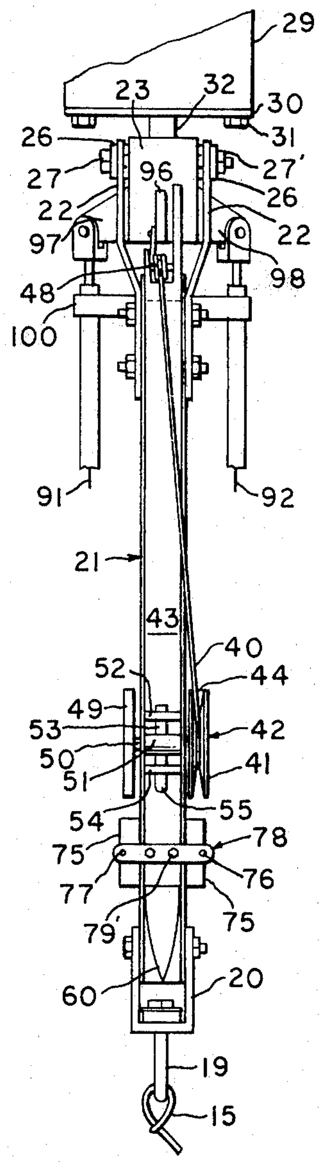
FIGURE 10 is a rear elevational view of the rotary wing device of FIGURE 8.

A second cable 40 also is connected to the main cable 15 at 39 (see FIGURE 8). As shown in FIGURE 10, the other end of the cable 40 is wound around a heavy pulley 41 of a gyroscope 42, which is supported on a support arm 43. A seal 44 such as plastic, for example, is employed to prevent turning and fouling of the pulley 41 prior to actuation of the cable 40. The cable 40 is guided over a pulley 45 (see FIGURE 8) on the frame 21 and a pulley 47 on the support arm 43 (see FIGURES 8, 10, and 11). A second pulley 48 is disposed on the support arm 43 adjacent the pulley 47.

Accordingly, when the loop or slack portion of the main cable 15 is eliminated due to ejection of the rotary wing device 14 from the aircraft 10, two separate operations occur simultaneously. One of these is to break the cord 35 to allow the blades 29 to move to their operative position. The other is to start operation of the gyroscope 42 through rotating the pulley 41.

The gyroscope 42 includes a flywheel 49 (see FIGURE 10), which is connected to the heavy pulley 41 by a shaft 50. The shaft 50 is rotatably mounted in a ball bearing assembly 51, which is rockably mounted on the support arm 43.

Figure 11:
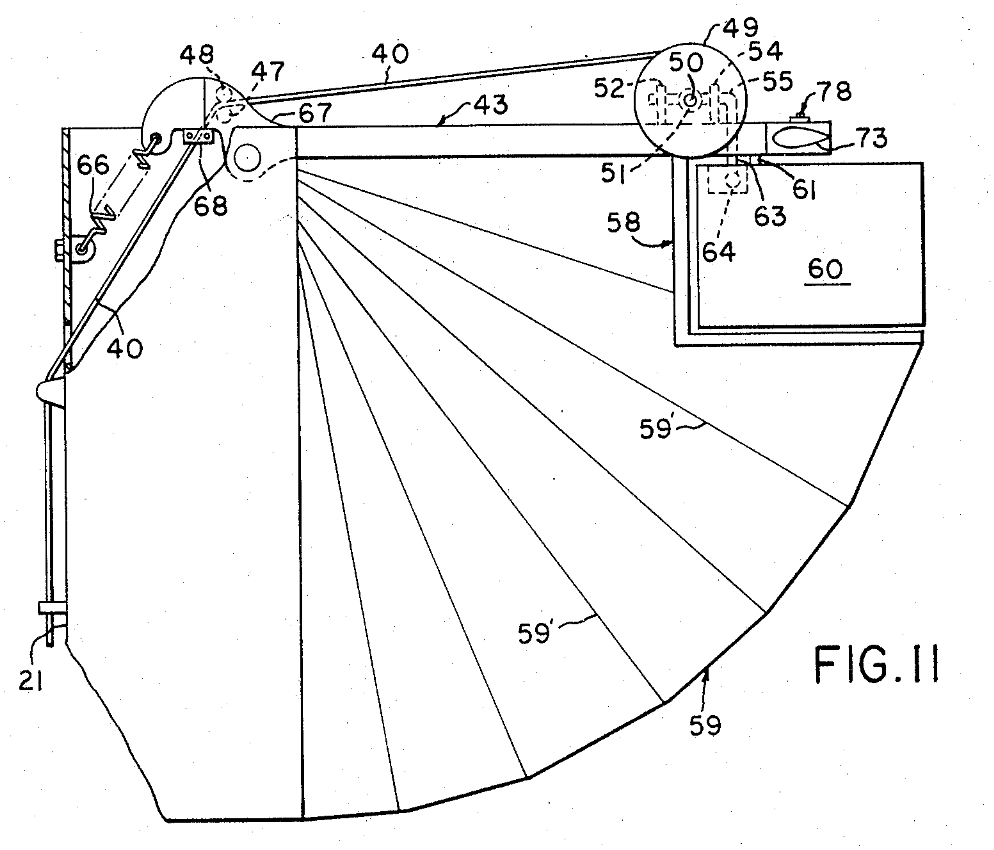
FIGURE 11 is a side elevational view of a portion of the rotary wing device of FIGURE 8 with a rudder and its associated collapsible fin extended to their operative positions.

A support lug 52 extends from the upper surface of the support arm 43 (see FIGURE 11). A rod 53, which extends from the non-rotatable portion of the ball bearing assembly 51, is rockably disposed within an aperture in the support lug 52.

A second support lug 54 (see FIGURE 11) extends from the upper surface of the support arm 43 on the opposite side of the shaft 50 of the gyroscope 42 from the support lug 52. A rod 55 extends from the non-rotating portion of the ball bearing assembly 51 in the opposite direction from the rod 53 and is rockably disposed within an aperture in the support lug 54.

Accordingly, the gyroscope 42 is rockably mounted on the support arm 43 through the rod 53 being disposed in the support lug 52 and the rod 55 being disposed in the support lug 54. The support lug 52 and 54 have the apertures therein aligned with each other to insure that the gyroscope 42 is rockably mounted about a single axis, which is preferably aligned with the longitudinal axis of the support arm 43.

Thus, rotation of the pulley 41 also causes rotation of the shaft 50 and the flywheel 49, all of which form the rotating inertia system for the gyroscope 42. Because of the rockable mounting arrangement, the gyroscope 42 will rock about the axis of the openings in the support lugs 52 and 54 whenever the rotary wing device 14 is tilted from the vertical or turned in a horizontal plane. In the former case, this is due to the inertia effect of the rockable gyroscope; in the latter case, this is due to precessing of the gyroscope.

The support arm 43 is pivotally mounted on the frame 21 by a bolt 56 and a nut 57 (see FIGURE 8). Thus, the arm 43 is pivotally movable with respect to the frame 21. The bolt 56 has a pulley mounted thereon over which the cable 40 passes.

As shown in FIGURE 11, an L-shaped frame 58 extends downwardly from the lower surface of the support arm 43 and is integral with the support arm 43. A collapsible fin 59 is attached to the L-shaped frame 58, the lower surface of the support arm 43, and the two aft edges of the U-shaped frame 27 through two branches of the Y forming the flexible material making up the fin 59. The fin 59 is formed of a suitable lightweight collapsible material such as sail cloth, for example, with a plurality of staves 59' therein.

A rubber 60 is pivotally mounted by a pin 61 to the support arm 43. The axis of the pin 61 is disposed slightly ahead of the center of pressure of the rudder 60. The pin 61 is disposed within a ball bearing assembly (not shown) in the support arm 43. Thus, the rubber 60 is able to pivot easily with respect to the support arm 43.

The rod 55 has a downwardly extending portion 63, which terminates in a ball 64. The ball 64 is disposed within a slot in the rudder 60 to provide a ball and slot connection between the rod 55 and the rudder 60.

Thus, any rocking movement of the gyroscope 42 causes pivotal movement of the rudder 60 about the axis of the pin 61. If the rotary wing device 14 should tilt from the vertical to the right, the gyroscope 42 will tend to remain in its original position to thereby cause the rudder 60 to turn to the right. In turn, the action of the rudder 60 causes the gyroplane to turn to the left. This causes a side slip effect to the right causing the rotor to right the rotary wing device 14 to return laterally to the horizontal and again become stable.

If the rotary wing device 14 should turn to the right, the gyroscope will precess so as to cause it to rock to the left about the axis of the rod 55 to thereby cause the portion 63 to move to the right. This causes the rudder 60 to rotate to the right about the axis of the pin 61 to thereby create a force on the rudder 60 to the right and cause the rotary wing device 14 to turn to the left or to correct for the right turn. The direction of rotation of the gyroscope 42 is selected so as to produce the proper direction of precession of the gyroscope 42 as described above. This action causes a change in the direction of air flow over the rotor which, due to its greater blade flapping in front (see lines 30–35, column 5), creates a correction for the lateral moments.

When the rotary wing device 14 is ejected from the aircraft 10, the support arm 43, the rudder 60, and the collapsible fin 59 are disposed within the U-shaped frame 21 as shown in FIGURES 8 to 10. A cord 65 retains the support arm 43, the rudder 60, and the collapsible fin 59 within the U-shaped frame 21.

A spring 66, which has one end attached to the frame 21 and its other end attached to an extension 67 of the support arm 43, constantly urges the support arm 43, the rudder 60, and the fin 59 out of the frame 21. However, the cord 65 retains the arm 43, the rudder 60, and the fin 59 within the U-shaped frame 21 until the cord 65 is severed. Pivotal movement of the support arm 43 by the spring 66 when the cord 65 is severed is limited by engagement of the extension 67 of the support arm 43 with a stop 68 on the frame 21 as shown in FIGURE 11.

The axis of the shaft 50 of the gyroscope 42 is parallel to the pivot axis of the support arm 43. This permits the support arm 43, the rudder 60, and the fin 59 to be deployed from within the U-shaped frame 21 to the position of FIGURE 11 without activating the rudder 60 due to displacement of the gyroscope 42.

Figures 3, 4:
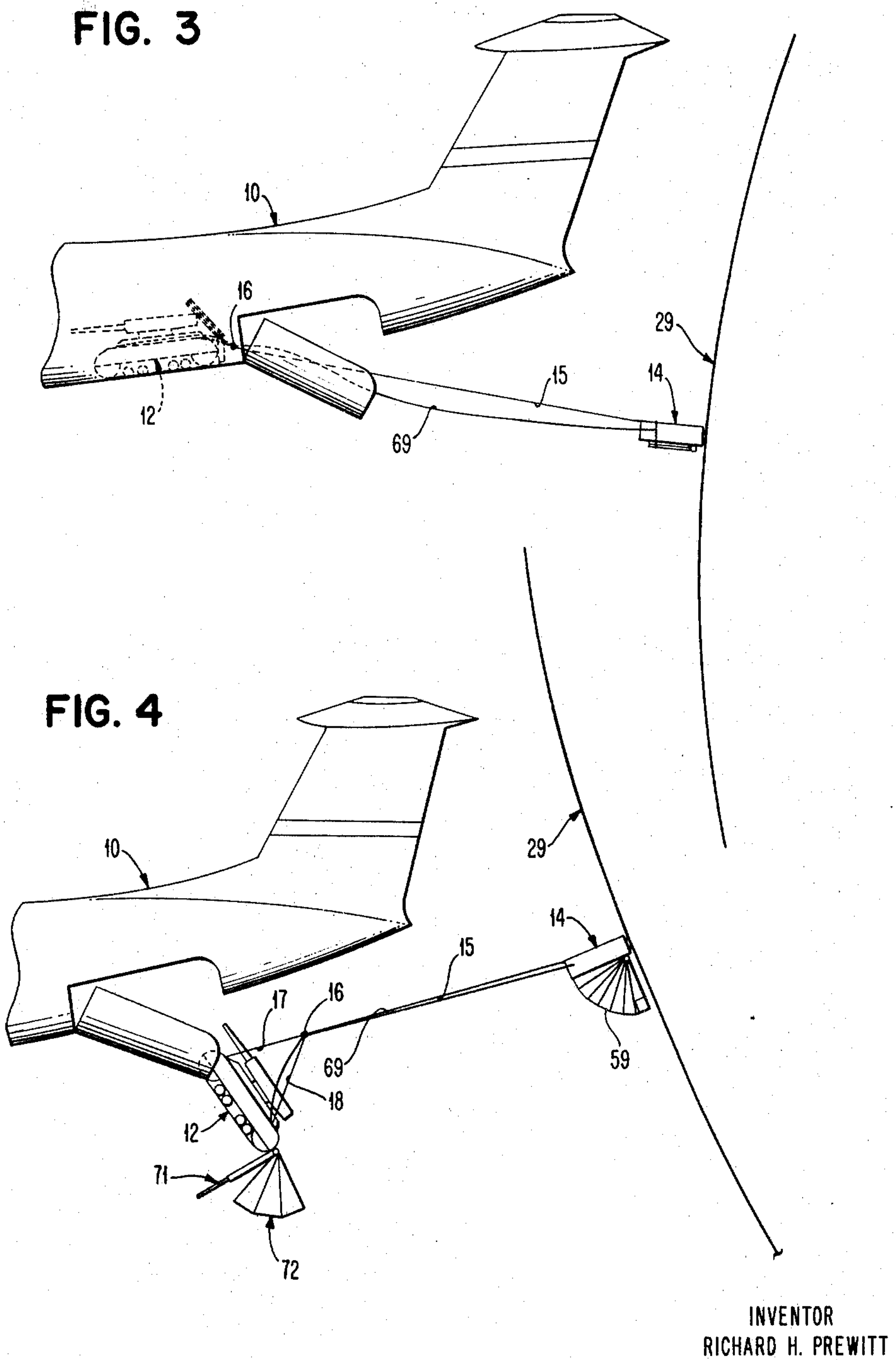
FIGURE 3 is a schematic side elevational view, similar to FIGURE 2, and showing the rotor blades of the rotary wing device in their operative position.
FIGURE 4 is a schematic side elevational view, similar to FIGURE 3, and showing the load, which is attached to the rotary wing device of the present invention, as it is pulled from the aircraft.

After the rotary device 14 is ejected or deployed from the aircraft, the slack or loop portion in the cable 15 straightens out as shown in FIGURE 3. As previously mentioned, the pull on the cable 15 to remove the loop or slack portion of the cable 15 pulls both the cables 38 and 40, which are connected at 39 to the cable 15. As a result, the cord 35 is cut, and the gyroscope 42 begins to rotate.

Figure 2:
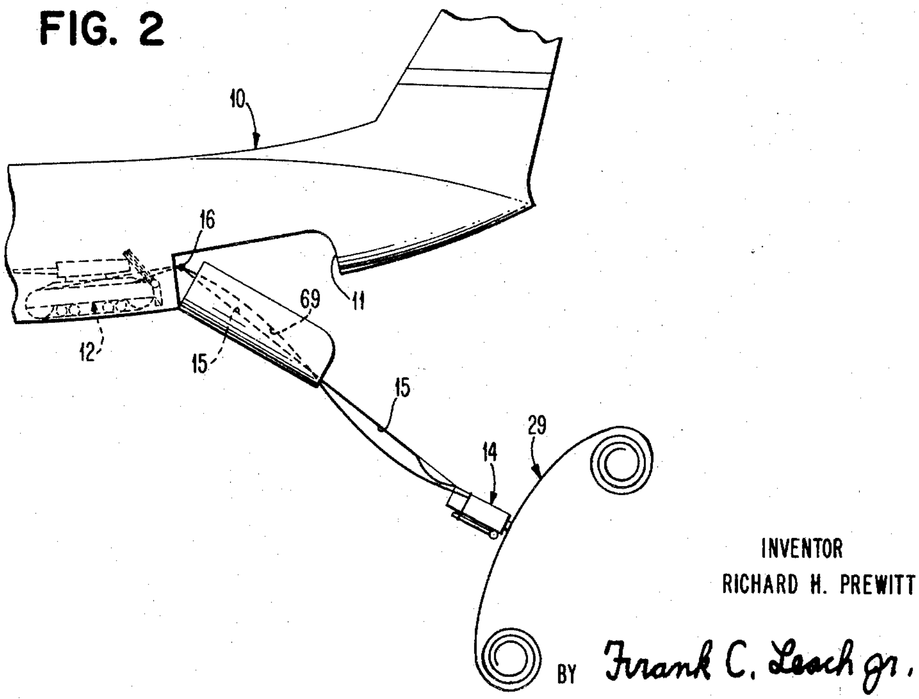
FIGURE 2 is a schematic side elevational view, similar to FIGURE 1, and showing the rotor blades of the rotary wing device starting to move to their operative position.

The cutting of the cord 35 results in the blades 29 beginning to uncoil as shown in FIGURE 2. The blades are shown fully uncoiled in their operative position in FIGURE 3 at a high angle of attack with the load 12 still disposed within the aircraft 10. As the load 12 leaves the aircraft 10 (see FIGURE 4), the aft cables 18 become taut. This is because the weight of the load 12 is now on the aft cables 18 due to the rearward ejection or deployment of the load 12 from the aircraft 10.

Figure 5:
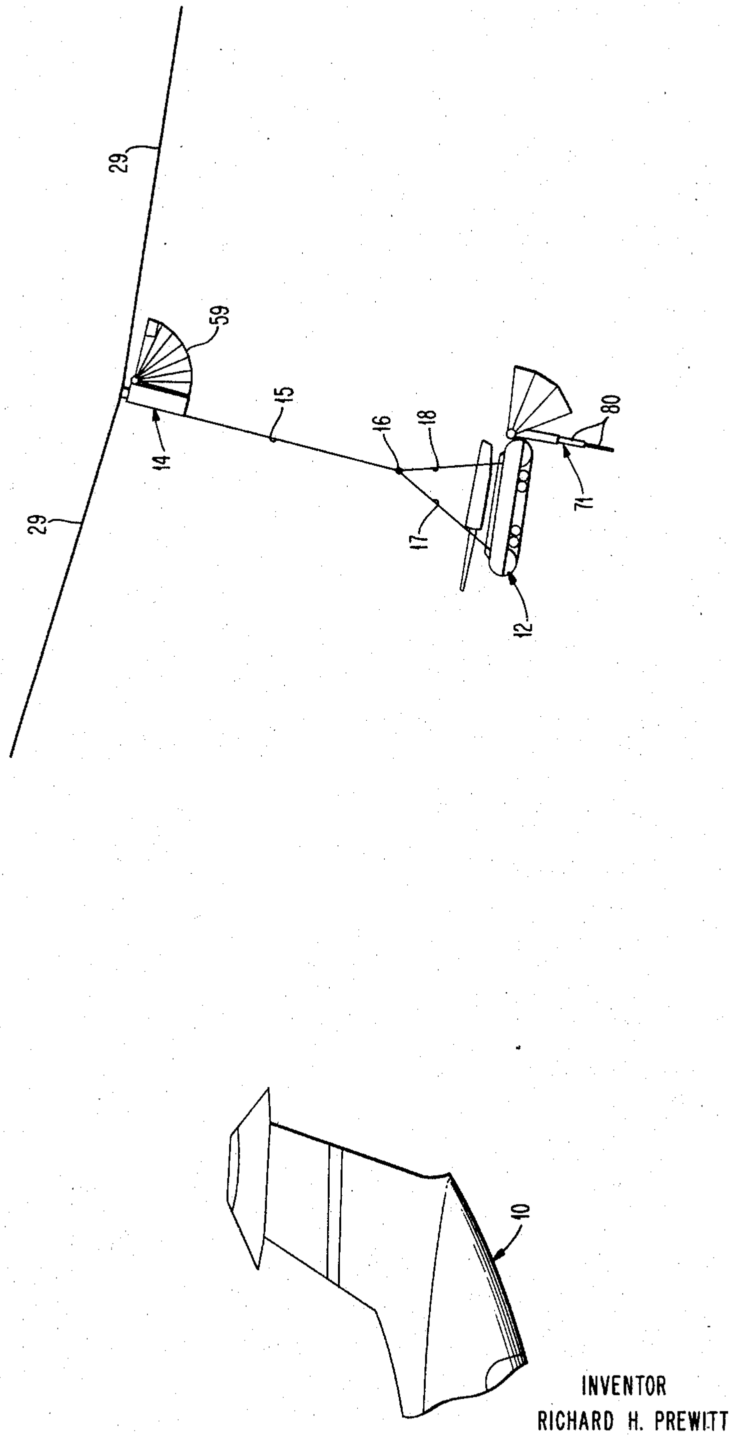
FIGURE 5 is a schematic side elevational view, similar to FIGURE 4, with the rotary wing device supporting the load during climb.
Figures 6, 7:
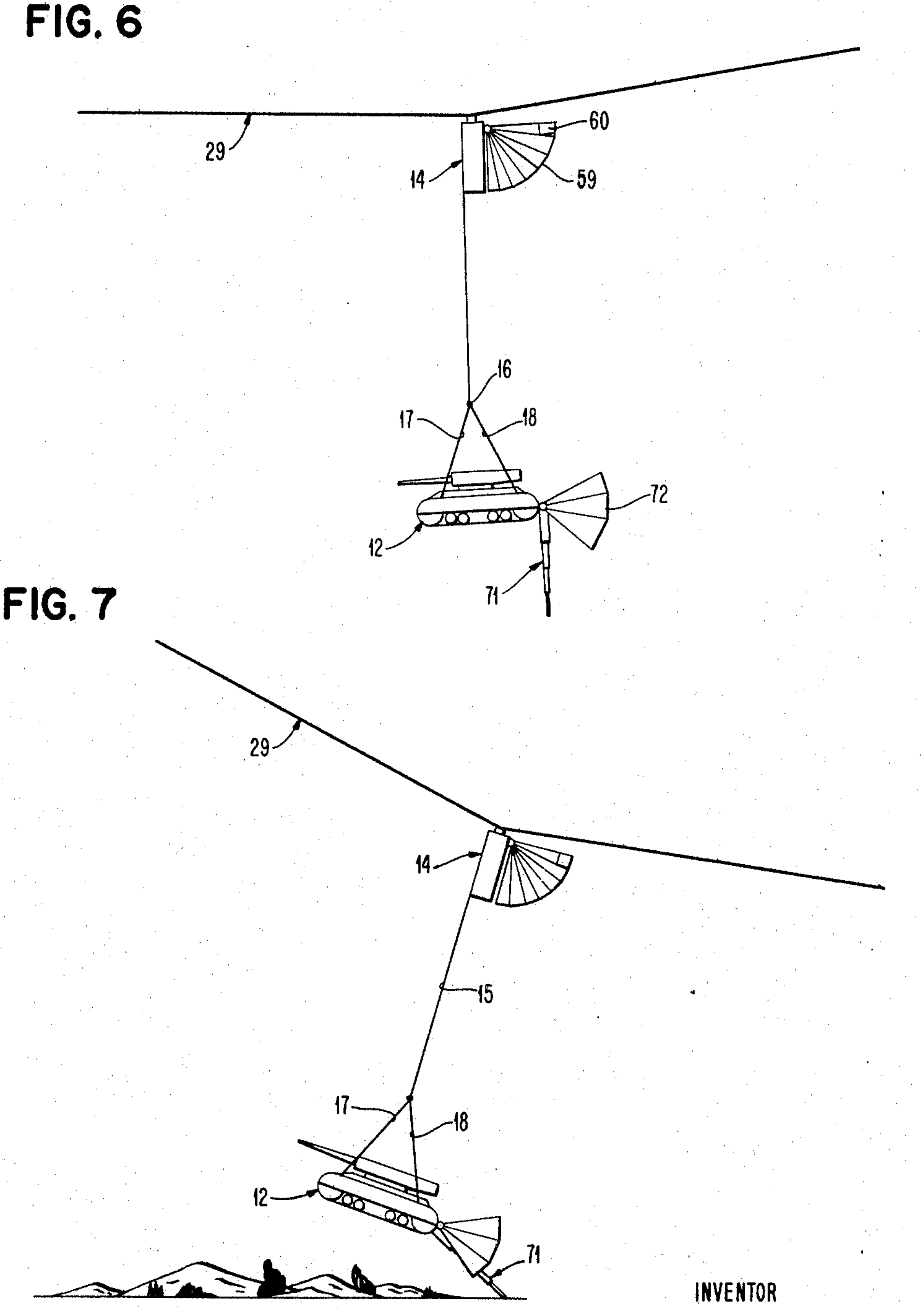
FIGURE 6 is a schematic elevational view of the rotary wing device and its load as the rotary wing device and its attached load begin to descend.
FIGURE 7 is a schematic side elevational view of the rotary wing device and its attached load just prior to the load contacting the ground.

When the aft cables 18 become taut, a second cable 69, which extends from the load 12 to the rotary wing device 14 through the hoist ring 16, also becomes taut from a slack condition. The cable 69 has one end attached by a ring 70, which is similar to the ring 37, to the cord 65 (see FIGURE 8) and its other end passes through the ring 16 and is attached to the aft portion of the load 12 so as to deploy a feeler 71 and fins 72 as illustrated in FIGURES 4 to 6. Thus, when the cable 69 becomes taut or tight, it causes severing of the cord 65 and deployment of the feeler 71 and the fins 72.

The cable 69 has a stop **69*a* formed thereon adjacent its end having the ring 70. The stop 69*a*, which may be a ball, for example, cooperates with an eye bolt 69*b* on the frame 21. The ball stop 69*a* limits the amount of movement of the cable 69 after the cord 65** has been severed.

As a result of the severing of the cord 65, the spring 66 urges the support arm 43 out of the U-shaped frame 21 and to the position of FIGURE 11. As previously mentioned, pivotal movement of the arm 43 by the spring 66 is limited by the stop 68 on the frame 21. When the support arm 43 reaches the position of FIGURE 11, both the fin 59 and the rudder 60 are in their operative positions.

As previously stated, the pivot axis of the support arm 43 is parallel to the axis of the shaft 50 of the gyroscope 42 when the gyroscope 42 is at its middle or unrocked position. This insures that the gyroscope 42 tends to be disposed at its middle or unrocked position when the support arm 43 is moved to the position of FIGURE 11.

Since rotation of the gyroscope 42 started when the loop or slack portion was removed from the cable 15, the gyroscope 42 is operating at the desired speed when the support arm 43 is pivotally moved from the U-shaped frame 21 to the position of FIGURE 11. Accordingly, when the support arm 43 reaches the position of FIGURE 11, the fin 59 and the rudder 60, which is controlled by the gyroscope 42, cooperate to maintain the direction of glide of the rotary wing device 14 the same as the direction of flight of the aircraft 10 at the time of deployment of the load 12 from the aircraft 10.

The cable 40, which activates the gyroscope 42, is guided at its upper or forward end by the pulleys 47 and 48 in such a manner that at this point the center of the cable 40 lies at the center of the projection of the rod 55. This arrangement is provided so that a force applied to the cable 40 will not create a disturbing force on the gyroscope 42 so as to cause it to rotate about the rod 55.

The feeler 71, which is attached to the load 12, extends beneath the load 12 as it is ejected or deployed from the aircraft 10 as shown in FIGURE 4. The pair of fins 72, which are collapsible and preferably formed of the same material as the fin 59, is connected to the aft end of the load 12. The feeler 71 and the fins 72 are positioned as shown in FIGURE 4 at the time that the fin 59 and the rudder 60 are disposed in their operative positions.

After the load 12 has left the aircraft 10, the rotor blades 29 will be operating with greater than normal thrust. Because of the high angle of attack of the assembly of the rotor blades 29, the rotary wing device 14 has a high rate of climb shortly after the time that the load 12 leaves the aircraft 10 and starts to drop. As a result, the rotary wing device 14 climbs above the load to substantially eliminate the initial drop of the load. This is illustrated in FIGURE 5.

Actually, the rotary wing device 14 begins to climb above the load after the load has dropped below the position illustrated in FIGURE 4 and it is still climbing in the attitude illustrated in FIGURE 5. From FIGURES 4 and 5 and this description, it can be seen that the load 12 first drops down and back of the aircraft 10 and then it is raised while the kinetic energy of motion is being dissipated.

Thus, by utilizing the kinetic energy, which results from the translational speed of the rotary wing device 14 at the time that the load 12 is deployed from the aircraft, the rotary wing device 14 climbs and prevents any appreciable drop of the load 12 so that the load may be dropped from a very low altitude of the aircraft 10. It should be observed that the rotary wing device 14 is moving with the aircraft 10 and at the same speed as the aircraft 10 just prior to its ejection from the aircraft 10 because of its connection to the load 12. Thus, it is only after the load 12 has been ejected from the aircraft 10 that the rotary wing device 14 is no longer moving at the same speed as the aircraft 10.

Because the mass density/drag ratio of the load 12 is considerably greater than the mass density/drag ratio of the rotary wing device 14 and this is true in most all instances, the load 12 tends to stay ahead of the rotary wing device 14 (see FIGURE 5) until the gliding speed of the rotary wing device 14 has decelerated to that for which the rotary wing device 14 is designed. The gliding speed of the rotary wing device 14 is determined by the location of the center of the bolt 27 relative to the center of the hub shaft 32 and by the weight and the drag moment of the feeler 71. It should be understood that the rotary wing device 14 will tend to climb at all times from the time that the load 12 is deployed or ejected from the aircraft 10 until the predetermined gliding speed of the rotary wing device 14 is attained. This would probably be near the speed for minimum rate of descent.

When the rotary wing device 14 reaches its predetermined gliding speed, the load 12 will then have moved to the position in which it is slightly to the rear of a vertical relative to the load 12 as shown in FIGURE 6. This movement of the load 12 slightly back of the vertical relative to the load 12 is due to the combined influence of gravity and the wind or air drag. Thus, after the rotary wing device 14 reaches its glide speed, the load 12 and the rotary wing device 14 descend in the relation shown in FIGURE 6.

The location of the pivot axis of the hub 23 (the axis of the bolt 27) relative to the centerline of the hub shaft 32 also serves to cause the rotary wing device 14 to climb above the load 12 as soon as the rotor blades 29 accelerate. This is because the center of thrust is at the center of the hub until there is a flow over the rotor disk from top to bottom or transverse. When the transverse flow across the rotor blades 29 builds up to a given value, the blades will flap fore and aft causing the center of pressure of the rotor blades 29 to move forward toward the pivot axis of the hub 23. When the center of pressure of the rotor blades 29 moves forward to correspond with the pivot location of the hub 23, the system will continue to operate in this attitude relative to the load. This is expected to resemble the positions indicated in FIGURES 5 and 6 where there is a smaller angle between the tow line 15 and the forward blade than between the tow line 15 and the aft blade.

The feeler 71 is so mounted on the load 12 that it assumes a vertical position as the load 12 descends. Since the feeler 71 is disposed beneath the load 12, it contacts the ground before the load 12 reaches the ground.

When the load 12 leaves the aircraft 10, a pair of horizontal stabilizers 73 is deployed. This immediately creates a forward pitching moment on the rotary wing device 14 causing it to assume an efficient angle of climb.

The pair of horizontal stabilizers 73, which preferably have an air foil shape, is disposed at the outer end of the support arm 43 to provide damping in pitch and to aid in stabilizing the rotary wing device 14. Each of the stabilizers 73 is pivotally connected to the support arm 43 by a hinge 74 (one shown in FIGURE 13).

Figure 13:
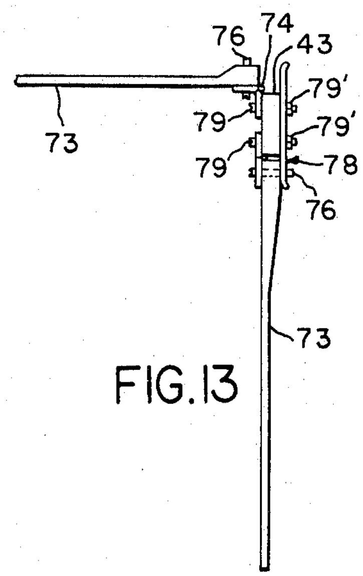
FIGURE 13 is a rear elevational view of the structure of FIGURE 12.
Figure 12:
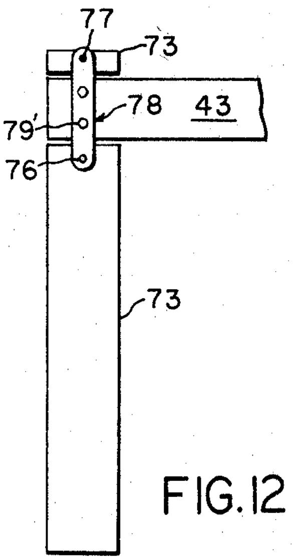
FIGURE 12 is a top plan view showing the mounting of the horizontal stabilizers at their folding hinges with one stabilizer folded to an inoperative position and the other in its operative position.

When the support arm 43 is retained within the U-shaped frame 21 by the cord 65, the stabilizers 73 are held in a folded position, as shown for one of the stabilizers 73 in FIGURES 12 and 13, by cups 75 (see FIGURES 8 to 10) on opposite sides of the U-shaped frame 21.

As the support arm 43 is pivoted away from the U-shaped frame 21 by the force of the spring 66 after the cord 65 has been severed, the stabilizers 73 are withdrawn from the cups 75. When this occurs, air pressure causes pivoting of the stabilizers 73 about their hinges 74.

When the stabilizers 73 reach a horizontal position, they are locked in this position by a locking pin 76. Each of the locking pins 76 fits within a cooperating aperture or opening 77 in a strap 78, which is secured to the upper surface of the support arm 43 by bolts 79 and cooperating locking nuts 79′.

As shown in FIGURE 13, the outer ends of the straps 78 are deflected upwardly. This facilitates entrance of the locking pins 76 into the apertures 77 in the strap 78.

Accordingly, the horizontal stabilizers 73 move to the operative position when the support arm 43 moves into the position in which the fin 59 and the rudder 60 are operative to control the glide of the rotary wing device 14. The arrangement between the locking pins 76 and the openings 77 in the strap 78 insures that the stabilizers 73 remain in the desired horizontal position.

Figure 14:
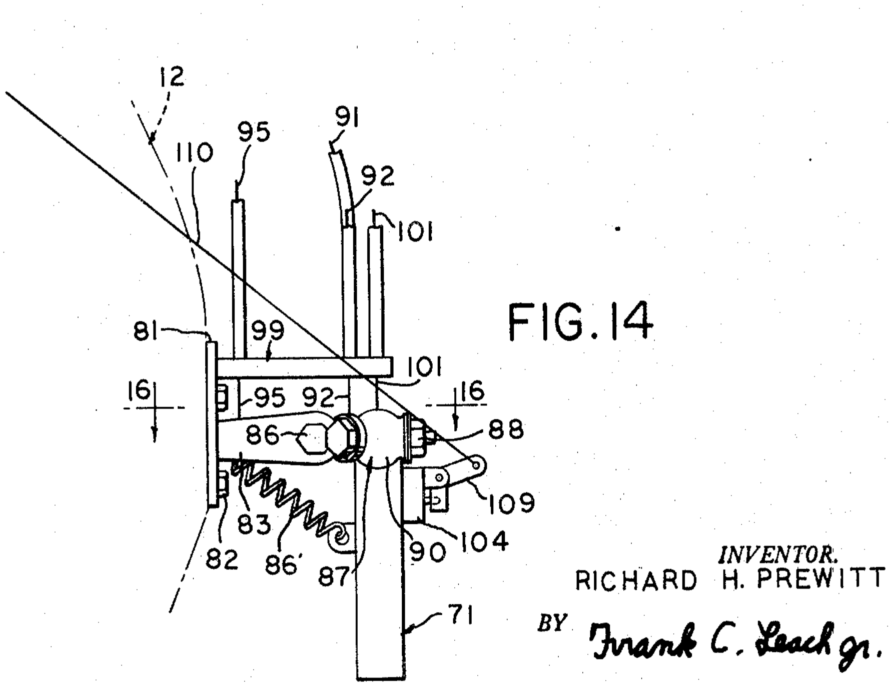
FIGURE 14 is a side elevational view of a feeler structure, which is attached to a load for controlling the attitude and pitch of the rotor blades.
Figures 16, 21, 22:
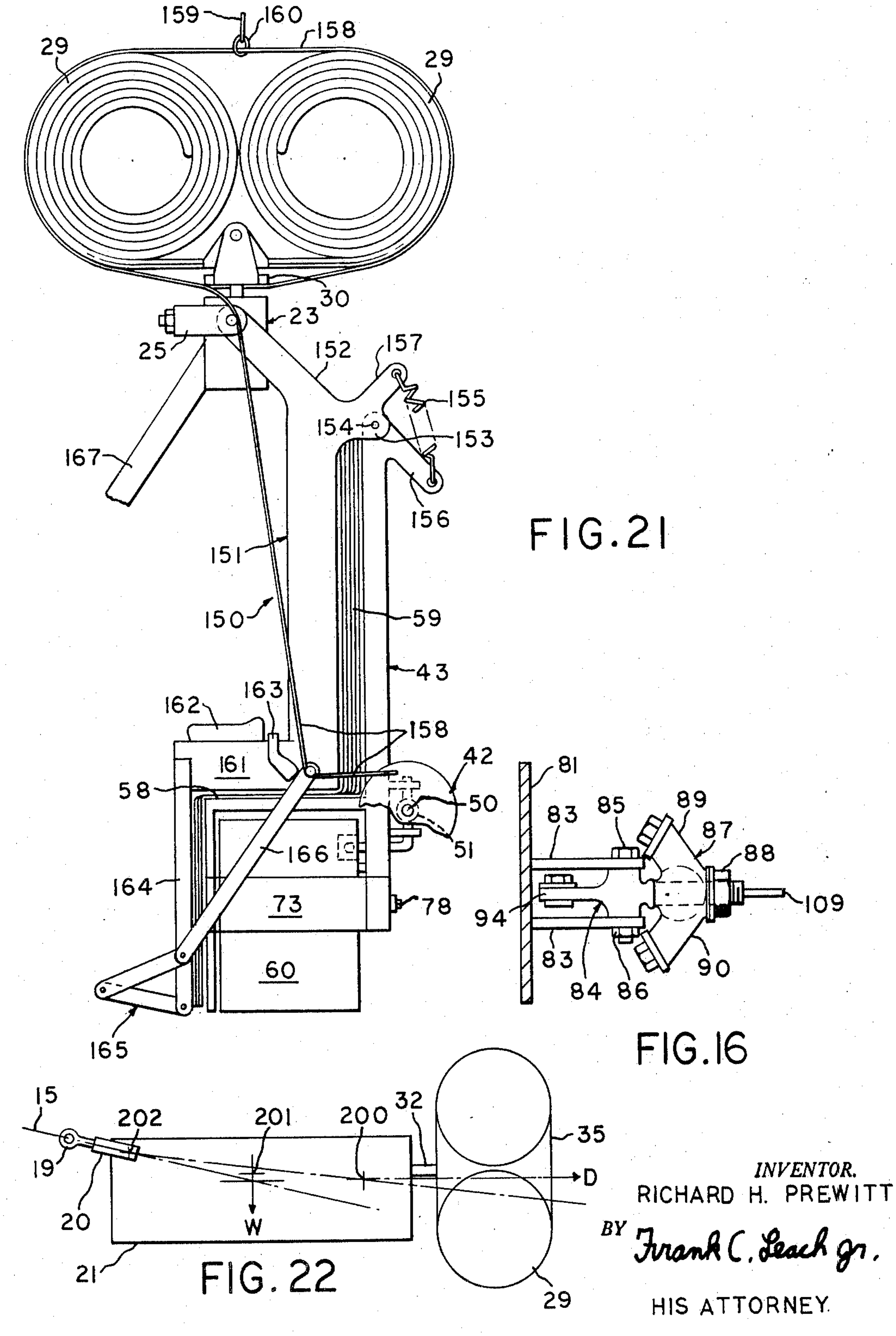
FIGURE 16 is a top plan view, partly in section, taken along the line 16—16 of FIGURE 14.
FIGURE 21 is a side elevational view of a form of rotary wing device for dropping personnel from an aircraft.
FIGURE 22 is a schematic view showing certain force relationships.

The feeler 71, which comprises a plurality of telescopic tubular members 80 (see FIGURE 17), is universally connected to the load 12 through a mounting plate 81 (see FIGURES 14 and 16). The mounting plate 81, which is secured to the aft side of the load 12 by suitable means such as fastening wing bolts 82, has a pair of parallel arms 83 extending therefrom. A support member 84 (see FIGURE 16) is pivotally mounted between the two arms 83 of the mounting plate 81 on a bolt 85, which is secured to the arms 83 by a nut 86. A spring 86′ (see FIGURE 14) extends between the feeler 71 and the plate 81 to overcome the aerodynamic drag and weight moments on the feeler 71.

The feeler 71 includes a support portion 87 (see FIGURE 16), which is disposed above the telescopic tubular members 80, and has a bore extending therethrough to permit mounting of the feeler 71 on a reduced portion, which functions as an axle for the portion 87, of the support member 84. The portion 87 is retained on the support member 84 by a nut 88, which cooperates with a threaded portion on the end of the reduced portion of the support member 84. Thus, the feeler 71 is universally mounted on the load 12 since the feeler 71 may rotate about the axis of the reduced portion of the support member 84 and the support member 84 may pivot about the axis of the bolt 85.

The portion 87 of the feeler 71 has arms 89 and 90 extending therefrom. One end of a cable 91 is universally connected to the arm 89, and one end of a cable 92 is universally connected to the end of the arm 90. Each of the cables 91 and 92 is enclosed within a sheath 93 to permit the cables 91 and 92 to be flexible. One suitable example of this type of structure is a Bowden cable.

The support member 84 has an arm 94 extending therefrom in the opposite direction from the reduced portion, which pivotally supports the portion 87 of the feeler 71. A cable 95 has one end universally connected to the free end of the arm 94 of the support member 84. The cable 95 is enclosed in one of the sheaths 93 in the same manner as the cables 91 and 92.

The other ends of the cables 91, 92, and 95 are connected to the gimbal mounted hub 23. The cables 91, 92, and 95 position the hub 23 in the proper attitude relative to its gimbal mounting to properly dispose the assembly of the rotor blades 29 in response to the position of the feeler 71 with respect to the load 12.

The cable 95 is pivotally connected to an arm 96 (see FIGURE 8) extending rearwardly from the hub 23. Similarly, the cable 91 is pivotally connected to an arm 97 (see FIGURES 8–10) on the hub 23 extending forwardly at an angle from the left side of the hub 23 as viewed from the rear of the hub 23. The cable 92 is connected to an arm 98 (see FIGURES 9 and 10) extending forwardly at an angle from the opposite or right side of the hub 23 from the arm 97. Thus, the movements of the feeler 71 are transmitted to the hub 23 through the cables 91, 92, and 95.

For example, if the load 12 should move forwardly with respect to the ground to cause the feeler 71 to be moved rearwardly at its bottom, the support member 84 will pivot to cause downward movement of the cable 95. Since the arm 96 is connected to the rear of the hub 23, this downward movement of the cable causes the front portions of the hub 23 and the rotating plane of the rotor blades 29, which are rotatably connected to the hub 23, to move upwardly and the rear portion to move downwardly whereby increased lift is obtained from the rotor blades 29.

If the load 12 should move to the right as it approaches the ground, the bottom of the feeler 71 will be moved to the left whereby tension is placed on the cable 91 since the arm 89 is moved downwardly due to pivoting of the portion 87 about the axis of the reduced portion of the support member 84. Since the cable 91 is attached to the left arm 97 of the hub 23, this causes the right portion of the rotating plane of the rotor blades 29 to rise upwardly and the left portion to move downwardly whereby the rotor blades 29 cause the rotary wing device 14 and the attached load 12 to be moved toward the left.

The sheaths 93 are connected to a support plate 99 on the mounting plate 81. The upper end of each of the sheaths 93 is supported by brackets 100 (see FIGURES 8 to 10), which are attached to the frame 21. It should be understood that suitable guides are employed on the frame 21 and along the cables 15 and 18 to support the sheaths 93 in intermediate positions between the brackets 100 and the support plate 99.

Figures 17, 18:
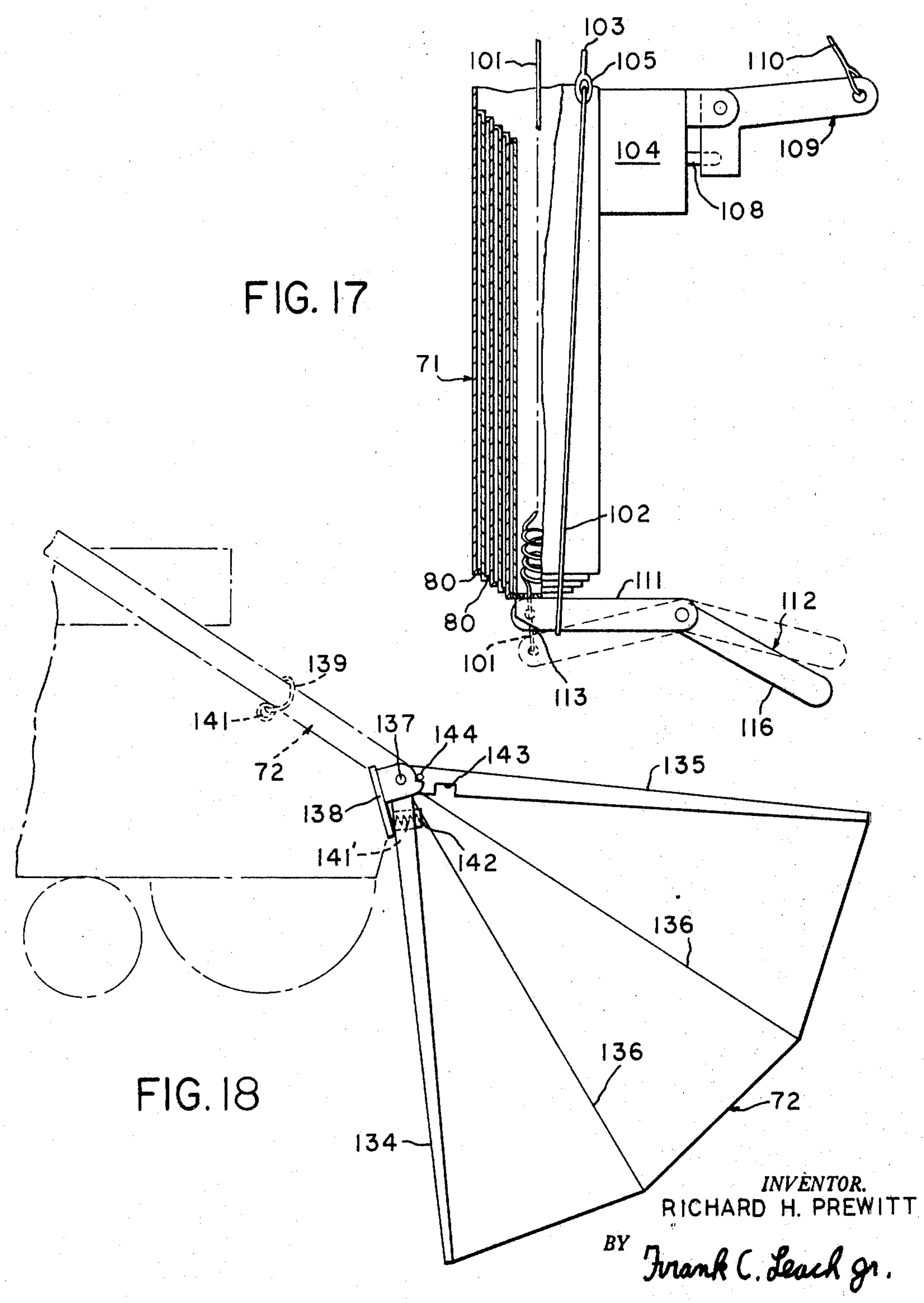
FIGURE 17 is an enlarged elevational view, partly in section, of the stowed feeler structure and cooperating components.
FIGURE 18 is a side elevational view of the structure of FIGURE 15.

The tubular members 80, which form the feeler 71, are shown in their telescoped position in FIGURE 17. Each of the members 80 has its upper end formed with an outwardly extending flange and its lower end formed with an inwardly extending flange to limit movement of the members with respect to each other. The bottom or lowermost member 80 is closed at its lower end except for a slight aperture through which a cable 101 passes.

A cord 102 is employed to retain the tubular members 80 in their telescoped relation. The cord 102 is attached to the cable 69 by a cord 103 through a ring 105. Thus, when the cable 69 becomes taut, as previously mentioned, the cord 102 is severed by the ring 105, which is similar to the ring 37. This permits the members 80 to be free to extend with respect to each other.

The upper end of the feeler 71 has a tank or container 104 thereon with an explosive charge therein. The tank 104 communicates with the interior of all of the tubular members 80. Since the lowermost tubular member 80 is closed except for the small aperture through which the cable 101 passes, ignition of the explosive within the tank 104 causes all of the members 80 to extend from their telescoped positions.

Ignition of the explosive charge within the tank 104 occurs when a cap is engaged by a hammer pin, which is resiliently biased into engagement with the cap by a spring. The cap, the hammer pin, and the spring are disposed within the tank 104.

A pin 108 is disposed between the hammer pin and the cap to prevent the hammer pin from engaging the cap due to the force of the spring. The pin 108 extends through a wall of the tank 104 and is attached to a lever 109, which is pivotally mounted on the exterior of the tank 104. The lever 109 has a cable 110 attached to the end of an arm thereon so that actuation of the cable 110 causes withdrawal of the pin 108 from between the hammer pin and the cap. When this occurs, the explosive charge within the tank 104 is fired or ignited and the tubular members 80 of the feeler 71 extended.

The cable 110 also is attached to the cable 69 through the cord 103. Thus, firing of the explosive charge within the tank 104 occurs approximately simultaneously with breaking of the cord 102. If the cord 102 is not severed by the time that the explosive charge in the tank 104 is ignited to cause extension of the tubular members 80, the extension of the tubular members 80 will break the cord 102. Accordingly, extension of the tubular members 80 of the feeler 71 occurs substantially simultaneously with release of the support arm 43 from the frame 21.

The bottom end of the lowermost of the tubular members 80 of the feeler 71 has an arm 111 fixedly attached thereto. A lever 112 is pivotally mounted on the end of the arm 111. When the cord 102 is wrapped around the tubular members 80 of the feeler 71 to maintain them in their telescoped relation, the cord 102 passes around the bottom of an arm 113 of the lever 112 in the solid line position of FIGURE 17. As actuated, the lever 112 is shown partly open in dashed line position in FIGURE 17.

The cable 101, which passes through the aperture in the bottom closed end of the lowermost of the tubular members 80, has one end attached to the arm 113 of the lever 112. As shown in FIGURE 17, a sufficient length of the cable 101 is coiled within the lowermost of the tubular members 80 to permit movement of the telescoping members 80 to their extended position without any pull on the cable 101. The cable 101 is enclosed within one of the sheaths 93 in the same manner as the cables 91, 92, and 95.

Figure 19:
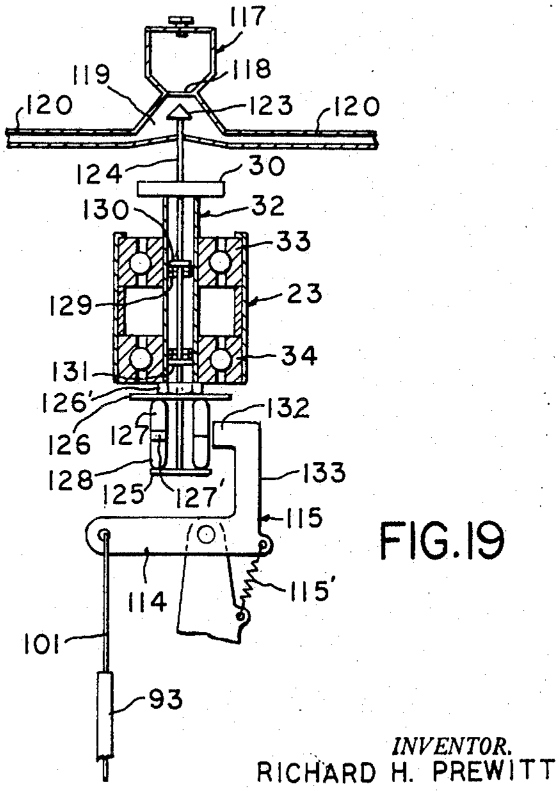
FIGURE 19 is a schematic elevational view, partly in section, of a portion of the structure for increasing the collective pitch of the rotor blades.

As shown in FIGURE 19, the upper end of the cable 101 is connected to an arm 114 of a lever 115, which is pivotally mounted on the frame 21 and biased clockwise by a spring 115'. The lever 115 is employed to cause the collective pitch of the rotor blades 29 to be increased whenever the lever 115 is pivoted due to tension occurring in the cable 101. It will be observed from FIGURE 17 that tension occurs in the cable 101 when arm 116 of the lever 112 engages the ground. Since the lever 112 is at the bottom of the feeler 71, it is readily noted that the cable 101 is actuated to cause increase in collective pitch as the load 12 approaches the ground but before it reaches the ground.

As shown in FIGURE 19, the structure for increasing the collective pitch of all of the rotor blades 29 simultaneously includes a tank 117, which is adapted to hold a suitable fluid such as water or mercury, for example. The bottom end of the tank 117 is closed by a membrane disk 118. A compartment 119, which has a conical side and a conical bottom, is disposed beneath the tank 117 and communicates therewith when the membrane disk 118 is broken or fractured.

Figure 20:
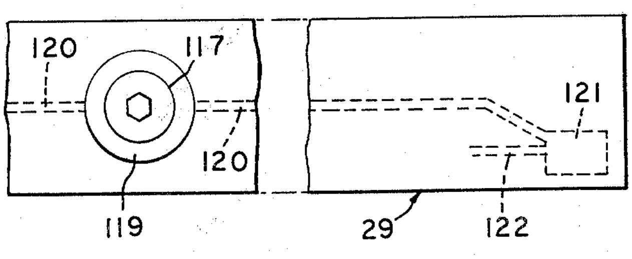
FIGURE 20 is a fragmentary top plan schematic view of a portion of the rotor blade structure including a portion of the device for increasing the collective pitch of the rotor blades.

A pair of tubes 120 extends from the compartment 119 with each of the tubes 120 being disposed in a different one of the rotor blades 29. The other end of each of the tubes 120 communicates with a tank 121 (see FIGURE 20) in the associated rotor blade 29 in which the tube 120 is disposed. The tank 121 is located as close to the trailing edge of the blade 29 and as close to the tip of the blade 29 as convenient. Each of the tanks 121 has a vent 122 to permit the air to escape from the tank when the tank 121 is being filled with fluid from the tank 117.

When the disk 118 is fractured or broken, fluid will flow from the tank 117 into the compartment 119. Since the rotor blades 29 are rotating, the centrifugal force of the rotor blades automatically causes the fluid, which enters the compartment 119, to distribute itself uniformly about the outer portions of the compartment 119. This facilitates equal distribution of the fluid to the tubes 120 into the tanks 121.

When the fluid flows into the tanks 121, it causes a rearward movement of the center of gravity of the tip of each of the blades 29. This causes each of the blades 29 to have its angle of attack increased whereby its lift is increased so that this increased lift retards the downward velocity of the rotary wing device 14 and the attached load 12. Furthermore, increasing the collective pitch of the rotor blades 29 causes rapid reduction of the speed of the rotor blades 29.

The fracturing or breaking of the membrane disk 118 is accomplished by a spear 123 on the upper end of a rod 124. The rod 124 extends through the hub attachment plate 30 and through the rotor shaft 32. The lower end of the rod 124 is disposed beneath the shaft 32 and the hub 23.

The lower end of the rod 124 has a disk 125 thereon. A disk 126 is disposed at the lower end of the shaft 32. The disk 126 includes a nut 126', which retains the shaft 32. Between the disks 125 and 126, two diametrically disposed assemblies are provided. Each of the assemblies comprises two over-center compression members 127 and 128 (see FIGURE 19). A hinge 127' (one shown in FIGURE 19) hingedly connects the members 127 and 128 to each other. Each of the hinges 127' is oriented on the sides of the members 127 and 128 in the direction of rotation.

A spring 129, which surrounds the rod 124, has one end abutting against a disk 130 attached to the rod 124. The other end of the spring 129 acts against an annular member 131, which is mounted on the inner surface of the rotor shaft 32.

The spring 129 constantly urges the rod 124 upwardly through acting on the disk 130. However, the assemblies of the compression members 127 and 128 engage disk 125 to limit the upper movement of the rod 124 by the spring 129 so that the spear 123 will not fracture or break the disk 118. However, if the assemblies of the hinged over-center compression members 127 and 128 have their hinge connections broken, then the force of the spring 129 can move the rod 124 upwardly so that the spear 123 breaks or fractures the membrane disk 118.

When the cable 101 is subjected to tension, it causes the lever 115 to pivot counterclockwise (as viewed in FIGURE 19) whereby a projection 132 on an arm 133 of the lever 115 moves into engagement with the over-center compression members 127 and 128. When this occurs, the assemblies of the over-center compression members 127 and 128 collapse as the projection 132 strikes the members of each assembly. When both assemblies are collapsed, the disk 125 is released to permit the attached rod 124 to move up. When this occurs, the membrane disk 118 is fractured and the fluid flows into the tanks 121 of the rotor blades 29 to increase the collective pitch of the blades 29.

Figure 15:
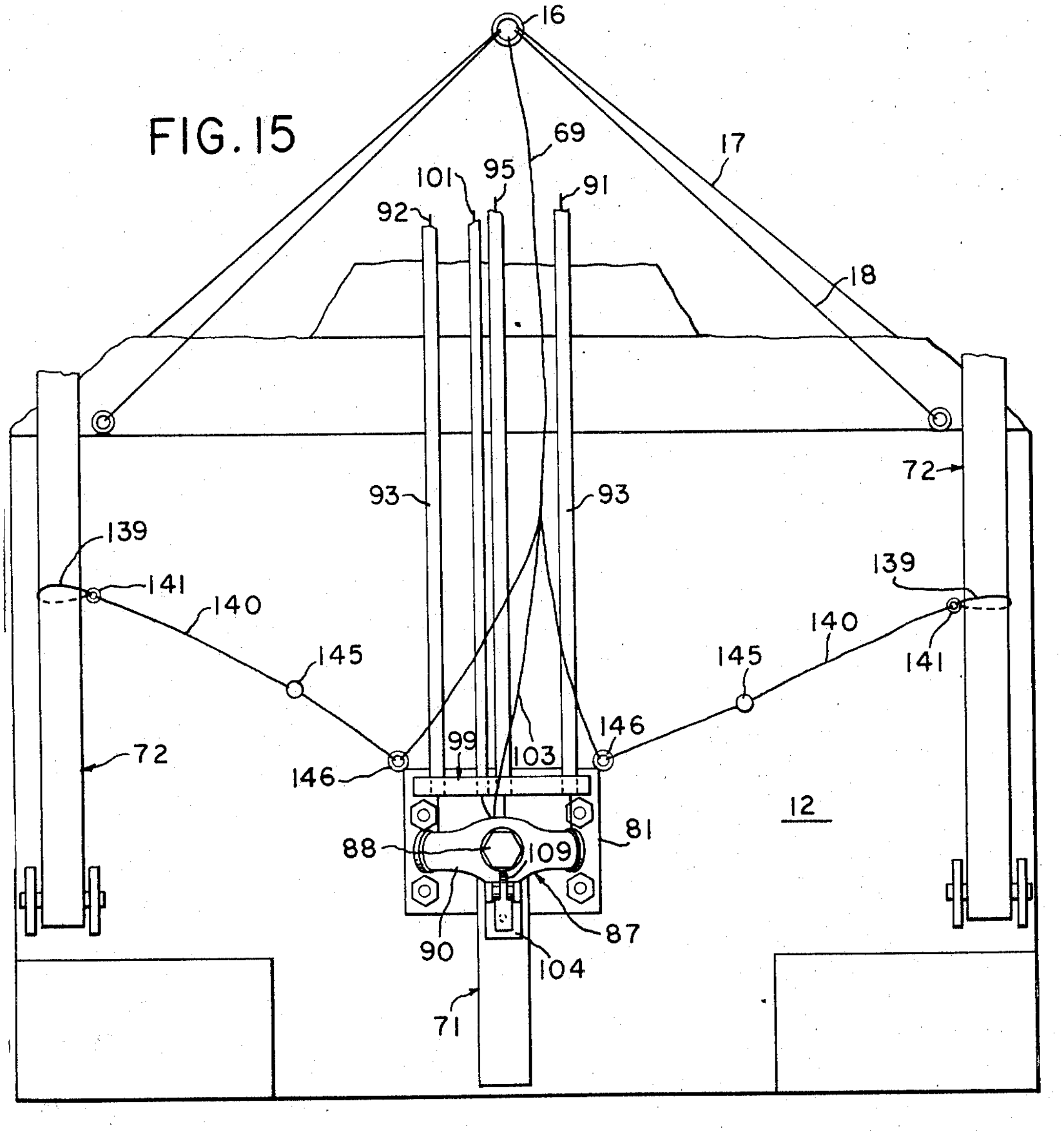
FIGURE 15 is a rear elevational view of the structure of FIGURE 14 and showing the collapsible fins thereon.

As shown in FIGURES 15 and 18, the pair of fins 72 is mounted on the back of the load 12 on opposite sides of the feeler 71. Since the construction for mounting each of the fins 72 is the same, only one will be described.

As shown in FIGURE 18, the fin 72 includes support arms 134 and 135. A suitable collapsible material such as sail cloth, for example, extends between the support arms 134 and 135 of the fin 72. When the fin 72 is in its operative position, the material of the fin 72 is fully extended. A plurality of staves 136 provides support to the intermediate portions of the fin 72.

The support arms 134 and 135 of the fin 72 are pivotally attached through a pivot pin 137 to a mounting plate 138. The mounting plate 138 is attached to the rear of the load 12 so that the fin 72 is pivotally mounted with respect to the load 12.

The fin 72 is held in a collapsed position (dashed lines of FIGURE 18) by a cord 139. A cord 140, which has one end attached to the cable 69, is attached to ring 141 through which the cord 139 passes.

When the cord 139 is broken or severed due to the cable 69 becoming taut, the lower support arm 134 is automatically pivoted from the dashed line position of FIGURE 18 to the solid line position of FIGURE 18 by a spring 141'. One end of the spring 141' is attached to the mounting plate 138 while the other end is attached to a cup 142, which is fixedly secured to the support arm 134. The spring 141' passes through an aperture in the lower support arm 134. The upper support arm 135 has a recess 143 therein to receive the cup 142 when the fin 72 is in its stowed position (dashed line position of FIGURE 18).

The downward movement of the upper support arm 135 is limited by a pin 144, which engages a portion of the mounting plate 138. Thus, the pin 144 and the cooperating structure on the mounting plate 138 along with the spring 141' are designed to insure that the material of the fin 72 is fully extended. This also serves to insure that downward movement of the fin 72 by the spring 141' is appropriately stopped.

Each of the cords 140 has a ball stop 145 thereon for cooperation with an eye bolt 146, which is mounted on the mounting plate 81. This retains the ends of the cords 140 after their ends having the rings 141 are no longer held by the cords 139 due to their breaking.

Since the cords 140 are connected to the cable 69, the fins 72 are deployed to their operative positions at the same time that the support arm 43 and the fin 59 are deployed to their operative positions. Similarly, the telescopic members 80 of the feeler 71 are extended at the same time since the cable 69 causes severing of the cord 102 and ignition of the explosive charge within the tank 104.

The cable 69 passes through the hoist ring 16 (see FIGURE 15) in order to provide for the shortening of the cable 69 when the aft hoist cables 18 become tight as the load 12 comes out of the aircraft 10 as illustrated in FIGURE 4. As previously mentioned, this shortening of the cable 69 due to it becoming taut produces the various operations.

Considering the operation of the present invention, the rotary wing device 14 is first ejected from the aircraft 10 through the opening 11 as shown in FIGURE 1. As the rotary wing device 14 falls from the aircraft, the cable 15 becomes taut so that its slack or loop portion starts to be removed therefrom. When this occurs, the cord 35, which is holding the rotor blades 29 in a coiled position, is severed and the gyroscope pulley 41 begins to rotate.

The uncoiling of the rotor blades 29 is shown in FIGURE 2 and complete uncoiling of the rotor blades 29 to their operative position is shown in FIGURE 3. At this time, the rotor blades 29 have a very high angle of attack.

The force acting on the rotor blades 29 causes the load 12 to be pulled from the aircraft 10 through the opening 11. As the load 12 falls from the aircraft, the cable 69 becomes taut to cause severing of the cord 65 whereby the support arm 43 is released from its retention within the frame 21 so that the fin 59 and the rudder 60 move to their operative positions. Simultaneously, when the cable 69 becomes taut, the tubular members 80 of the feeler 71 are extended due to severing of the cord 102 and the two fins 72 move to their operative positions due to the force of the springs 141' after the cords 139 are severed. This relation is shown in FIGURE 4.

Because of the high angle of attack of the assembly of the blades 29, the rotary wing device 14 tends to climb above the aircraft 10 as indicated in FIGURE 5. This climbing of the rotary wing device 14 is due to the utilization of the kinetic energy, which results from a retarding of the translational speed of the rotary wing device 14 at the time that the load 12 is deployed from the aircraft to the gliding speed of the gyroplane assembly. Since the mass density of the load 12 is considerably greater than the mass density of the rotary wing device 14, the load 12 tends to stay ahead of the rotary wing device 14 (see FIGURE 5) until the rotary wing device 14 has decelerated to the glide speed for which the rotary wing device 14 is designed.

When the rotary wing device reaches its glide speed, the load 12 moves to the position of FIGURE 6 in which it is slightly to the rear of a vertical relative to the load 12. This movement of the load 12 to the rear of the vertical relative to the load 12 is due to the wind or air drag.

As the load 12 approaches the ground (see FIGURE 7), the lever 112 on the feeler 71 contacts the ground. The contact of the arm 116 of the lever 112 on the feeler 71 with the ground causes the cable 101 to tighten. As a result, the membrane disk 118 is punctured by the spear 123 on the rod 124 so that fluid flows from the tank 117 into the tank 121 in each of the rotor blades 29. This causes the collective pitch of all of the rotor blades 29 to increase simultaneously to increase the lift of the rotor blades 29 to retard the downward velocity of the load 12 and the rotary wing device 14.

The increased lift of the rotor blades 29 also causes the speed of rotation of the rotor blades 29 to be substantially reduced. Thus, when the blades 29 strike the ground, they will have only a slight amount of kinetic energy so that damage, if any, to the blades 29 will be negligible.

Of course, as the load 12 approaches the ground, it may not approach the ground in a straight vertical descent as shown in FIGURE 6. That is, it may be moved to the right, to the left, straight ahead, or to the rear.

Any forward or rearward motion of the load 12 is transmitted through the feeler 71 and the cable 95 to the rotor hub 23. Thus, when the feeler 71 is moved to the rear as shown in FIGURE 7, this indicates that the load 12 is moving forward, As a result, it is desired to tilt the plane of rotation of the rotor blades 29 so that the front or forward portion of the plane of rotation is moved upwardly and the rear portion is moved downwardly. This relation is shown in FIGURE 7.

If the load 12 should move to the left, the feeler 71 moves to the right (as viewed in FIGURE 15). As a result, the cable 92 causes the plane of rotation of the rotor blades 29 to be tilted to the right. This tilting of the rotor blades 29 causes the load 12 to stop moving to the left.

Similarly, if the feeler 71 should move to the left (as viewed in FIGURE 15), then the cable 91 is placed under tension. As a result, the plane of rotation of the rotor blades 29 is tilted downwardly to the left. This causes a greater lift on the right side of the rotary wing device 14 to prevent movement of the load 12 to the right.

Thus, as the load 12 approaches the ground, the feeler 71 not only causes increased collective pitch of the rotor blades 29 to reduce the rate of descent of the load 12 but also provides the desired lateral and longitudinal control through changing the attitude of the rotor comprising the blades 29 relative to the air stream.

During the descent of the rotary wing device 14 and the attached load 12, any deviation from the directional flight path is sensed by the gyroscope 42. This causes the rudder 60 to make the desired correction to return the rotary wing device to its desired directional flight path. The gyroscope 42 acts in two different ways to maintain the original direction of flight.

For example, if the rotary wing device 14 should start to tlit slightly to the right. (This tilting occurs before the rotary wing device 14 starts to deviate from its flight path), then the inertia effect of the gyroscope 42 causes the larger portion of the rudder 60 to move to the left. This deflection of the rudder 60 to the left results in the rotary wing device 14 being turned so that it heads slightly to the left of the desired flight path. This corrects the tilt and also returns the rotary wing device 14 to its directional flight path as the rudder 60 returns to a neutral position.

In a second manner, the gyroscope 42 corrects for a turn of the rotary wing device 14. In this case when the axis of the gyroscope 42 is rotated as in a turn, it precesses about the axis of the rod 55 (see FIGURE 11).

Although the present invention is particularly adapted for low level air drops, the inclusion of guidance and control makes it especially effective for high level drops to a homing device on the ground.

Referring to FIGURE 21, there is shown a modification of the present invention in which a rotary wing device 150 is employed to permit dropping of personnel and/or cargo from a low flying aircraft. The rotary wing device 150 includes a tubular frame 151 having a pair of bifurcated arms 152 (one shown) at its upper end.

The hub 23 is gimbally mounted on the pair of bifurcated arms 152 in the same manner as it is gimbally mounted on the pylon arms 22 of the frame 21 of the rotary wing device 14. The yoke 25 is pivotally attached to the bifurcated arms 152 in the same manner as it is attached to the pylon arms 22. Thus, the hub 23 has the same movements as it does with the rotary wing device 14.

The support arm 43 is pivotally connected to a projection 153 on the frame 151 by a pivot pin 154. The support arm 43 has one edge of the collapsible fin 59 attached thereto along with supporting the gyroscope 42 and the rudder 60 in the manner described for the rotary wing device 14.

A spring 155 has one end connected to a projection 156 on the support arm 43 and its other end connected to a projection 157 on the frame 151. The spring 155 urges the support arm 43 to its operative position; the maximum movement of the support arm 43 is determined by engagement of the projection 156 on the support arm 43 with the projection 157 on the frame 151.

The support arm 43 is retained in the position of FIGURE 21 by a cord 158. The cord 158 also holds the rotor blades 29 in their coiled position in the same manner as the cord 35 held the rotor blades 29 of the rotary wing device 14 in their coiled position.

A cord 159, which has one end attached to the aircraft 10 and its other end attached to a ring 160, causes severing of the cord 158 by the ring 160 when the cord 159 becomes taut due to the rotary wing device 150 being ejected from the aircraft 10 through the opening 11. It should be understood that the ring 160 is formed in the same manner as the ring 37 for the rotary wing device 14.

Thus, when the rotary wing device 150 is ejected from the aircraft 10, the cable 159 becomes taut. As a result, the cord 158 is severed to allow the blades 29 to move to their operative position in the same manner as described for the rotary wing device 14. The severing of the cord 158 results in the spring 155 moving the support arm 43 until the projection 156 on the support arm 43 engages the projection 157 on the frame 151. Thus, the rotor blades 29 move to their operative position at substantially the same time as the fin 59 reaches its operative position.

It should be understood that the cable 40, which starts rotation of the pulley 41 of the gyroscope 42, is actuated by a cable (not shown) as the rotary wing device 150 leaves the aircraft 10. Rotation of the pulley preferably starts before the cord 158 is severed. However, if it is desired to start rotation of the pulley 41 only when the cord 158 is severed, then the cable 40 could be connected to the cable 159 for actuation when the cable 159 becomes taut.

The frame 151 of the rotary wing device 150 includes a seat support portion 161 having a seat 162 thereon to support the operator or pilot of the rotary wing device 150. A seat belt 163 is attached to the seat support portion 161 of the frame 151.

A leg portion 164 extends downwardly from the seat support portion 161. A foot rest 165 is disposed at the lower end of the leg portion 164 for the feet of the operator of the rotary wing device 150.

The leg portion 164 and the seat support portion 161 cooperate to form an L-shaped receptacle to receive a portion of the collapsible fin 59 and the rudder 60. It should be observed that the L-shaped frame 58 on the support arm 43 is disposed adjacent the seat support portion 161 and the leg portion 164 of the frame 151 with the material of the collapsible fin 59 therebetween.

The support arm 43 has the stabilizers 73 mounted thereon in preferably the same manner as described for the rotary wing device 14. In order to retain the stabilizers 73 in their inoperative position, a bracket 166 extends from the seat support portion 161 to the leg portion 164 of the frame 151 on each side thereof. Thus, the stabilizers 73 move to their operative position as soon as the support arm 43 pivots toward its operative position. Of course, the stabilizers 73 could be maintained in their operative position so that the brackets 166 could be eliminated if desired.

A control stick 167 is fixedly secured to the hub 23 to permit the operator or pilot of the rotary wing device 150 to control the hub 23 and the blades 29. Thus, through utiliaztion of the control stick 167, control of the assembly of the blades 29 is obtained whereby the pilot or operator of the rotary wing device 150 may control the descent of the rotary wing device 150.

The stick 167 is of the umbrella type wherein movements of the stick 167 are opposite to that produced at the rotor blades 29. For example, for lateral control, the stick is pushed laterally in a direction opposite to that in which it is desired to tilt the rotor. Thus, movement of the stick 167 to the right causes tilting of the rotating plane of the rotor blades 29 to the left whereby the rotary wing device 150 tilts to the left.

To create a flare for landing or to reduce the forward speed of the rotary wing device 150, the stick 167 is pushed forward. This raises the front portion of the rotating plane of the rotor blades 29 and lowers the rear portion of the rotating plane of the rotor blades 29.

Considering the operation of the rotary wing device 150 of FIGURE 21, the pilot or operator is positioned on the seat 162 and held thereon by the seat belt 163. When the rotary wing device 150 is ejected from the aircraft 10 through the opening 11, the cord 158 is severed whereby the rotary blades 29 move to their operative position. At the same time, the support arm 43 moves to its operative position. Either at the same time or prior thereto, the gyroscope 42 has its pulley 41 starting to rotate so that it will be effective to properly position the rudder 60.

In the same manner as described for the rotary wing device 14, the rotary wing device 150 climbs above the aircraft 10 because of the kinetic energy of translation in the device and its load. Thus, the rotary wing device 150 may be ejected from the aircraft at a relatively low altitude without danger to the pilot or operator of the rotary wing device 150.

If the rotary wing device 150 begins to tilt or turn, the gyroscope 42 senses this and tends to utilize the rudder 60 to directionally stabalize the rotary wing device 150. The pilot may aid or overcome this operation by appropriately moving the control stick 167.

As the rotary wing device 150 approaches the ground, the control stick 167 is moved forward to tilt the rotating plane of the rotor blades 29 rearwardly. This reduces the forward speed and the speed of descent. If the speed of the rotary wing device 150 should increase beyond that desired by the pilot during descent, it is only necessary for the pilot to push the stick 167 forward to change the attitude of the rotor blades 29 relative to the air stream to create a slower descent momentarily.

It should be observed that there is no collective pitch control of the rotor blades 29 in the rotary wing device 150 as there was for the rotary wing device 14. However, this is not necessary because the rotor blades 29 are controlled by the stick 167, and the pilot can create sufficient flare with the cyclic pitch control of the rotor blades 29 so that collective pitch control of the blades 29 is not needed.

When the rotary wing device is ejected from the aircraft, it stabilizes with the extendable support arm 43 in the lower side because of the relationship between its aerodynamic drag, its center of gravity, and the location of the tow cable attachment to the load. This is illustrated in FIGURE 22. Because of the drag of the blade assembly, the lateral center of pressure is located between the center of presure of the blades 29 and the frame 21 as indicated at 200. As long as the center of gravity noted at 201 falls below a line passing through tow line connection 202 and 200, the device will remain stable so that the connecting point 202 will remain in the uppermost position as illustrated. This can be realized by visualizing the drag vector D pulling directly aft and with the gravitational force acting down at W through the center of gravity 201.

When the blades and fin are deployed, the drag of the rotor blades is very great and their effective drag area is great relative to the drag of the extended fin. Also, when the support arm 43 and the fin 59 are deployed, the center of gravity 201 of the assembly is lowered. This also asists in maintaining the stablility of the rotary wing device 14 during the process of deployment.

An advantage of this invention is that it permits dropping a load from an aircraft at a low altitude. Another advantage of this invention is that it reduces the shock on the load when it strikes the ground. A further advantage of this invention is that the rotary wing device glides in a substantially straight flight path. Still another advantage of tis invention is that it eliminates or simplifies requirements for palletizing a load dropped from and aircraft. A still further advantage of this invention is that it eliminates the need for special equipment.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

I claim:

1. A gliding rotary wing device adapted to be dropped from an aircraft or the like including a body, rotor blades originally disposed in an inoperative position during initial dropping of said device from the aircraft and movable to an operative position during deployment of said device, means rotatably mounting said rotor blades on said body to produce a component from said rotor blades along a desired glide path in addition to a lift component, said rotor blades being rotatable solely by movement of air flow over said blades, rudder means connected to said body to directionally stabilize said body in descending gliding flight at an angle to the horizontal, and means connected to said rudder means to automatically control said rudder means throughout its glide in response to directional changes in said body relative to its initial direction of glide.

2. The device according to claim 1 in which said control means includes a gyroscope mounted on said body so as to be responsive to movements of said body.

3. The device according to claim 1 including means to retain said rotor blade in the inoperative position during initial dropping of said device from the aircraft and means to inactivate said retaining means during deployment of said device whereby said rotor blades move to an operative position.

4. The device according to claim 2 including means to retain said rotor blade in the inoperative position during initial dropping of said device from the aircraft and means to inactivate said retaining means during deployment of said device whereby said rotor blades move to an operative position.

5. The device according to claim 1 including a support arm pivotally connected to said body and said rudder means is pivotally connected to said support arm.

6. The device according to claim 3 including a support arm pivotally connected to said body and said rudder means is pivotally connected to said support arm.

7. The device according to claim 6 in which said control means includes a gyroscope rockably mounted on said support arm with its axis of rotation being parallel to the pivotal axis of said support arm when said gyroscope is positioned in the middle of its rockable travel.

8. The device according to claim 6 including means to retain said support arm in a stored position whereby said rudder means is inactive until said rotor blades are in the operative position.

9. The device according to claim 1 in which said control means also is responsive to lateral tilt of said body.

10. The device according to claim 1 in which said blade rotatably mounting means includes a non-rotating member, means pivotally connecting said non-rotating member to said body, and a shaft rotatably supported by said non-rotating member and connected to said blades, said pivotally connecting means having its pivot axis forward of the rotating axis of said shaft.

11. The device according to claim 5 including horizontal stabilizing means moutned on said support arm to aid in stabilizing the glide speed of said rotary wing device.

12. A gliding rotary wing device including a body, rotor blades originally disposed in an inoperative position and movable to an operative position during deployment, means rotatably mounting said rotor blades on said body to produce a component from said rotor blades along a desired glide path in addition to a lift component, rudder means connected to said body to directionally stabilize said body in descending gliding flight at an acute angle to the horizontal, and means connected to said rudder means to control said rudder means throughout its glide in response to lateral tilt of said body from its gliding descending path.

13. A rotary wing device adapted to be dropped from an aircraft or the like for supporting a load dropped from the aircraft, said device including a body, rotor blades, means rotatably mounting said rotor blades on said body, said rotor blades being rotatable solely by movement of air flow over said blades, rudder means connected to said body to directionally stabilize said body, means to control said rudder means during free flight of said body in accordance with the position of said body with respect to the vertical, and means adapted to be attached to the load to automatically control the angle of attack of said blades when the load approaches the ground by said last mentioned means engaging the ground whereby the angle of attack of said blades is changed by causing said rotary wing device to flare so as to reduce the gliding and descending speed of said rotary wing device and the load relative to the ground prior to the load engaging the ground.

14. The device according to claim 13 in which said rudder control means includes a gyroscope mounted on said body so as to be responsive to movements of said body from the vertical.

15. The device according to claim 14 in which said rotor blades are originally disposed in an inoperative position, means to retain said rotor blades in the inoperative position during initial dropping of said device from the aircraft, and means to inactivate said retaining means whereby said rotor blades move to an operative position during deployment of said device.

16. The device according to claim 15 in which said inactivating means also causes actuation of said gyroscope.

17. The device according to claim 13 including a support arm pivotally connected to said body, said support arm being movable from an inoperative position to an operative position after said device is dropped from the aircraft, and said rudder means is pivotally connected to said support arm.

18. The device according to claim 15 including a support arm pivotally connected to said body and said rudder means is pivotally connected to said support arm.

19. The device according to claim 18 in which said gyroscope is rockably mounted on said support arm with its axis of rotation being parallel to the pivotal axis of said support arm when said gyroscope is positioned in the middle of its rockable travel.

20. A rotary wing device for supporting a load dropped from an aircraft or the like, said device including a body, rotor blades, means rotatably mounting said rotor blades on said body, a support arm pivotally connected to said body, rudder means pivotally connected to said support arm to directionally stabilize said body, means to control said rudder means during free flight of said body in accordance with the position of said body with respect to the vertical, means adapted to be attached to the load to control the angle of attack of said blades when the load approaches the ground whereby the angle of attack of said blades is changed by causing said rotary wing device to flare so as to reduce the speed of said rotary wing device and the load relative to the ground, a collapsible fin connected to said support arm and said body, and collapsible fin means adapted to be attached to the load.

21. The device according to claim 20 including means to retain said support arm in a stored position whereby said rudder means and said connected fin are inactive and means to automatically deploy said support arm, said rudder, and said fin when the load is pulled from an aircraft.

22. The device according to claim 20 including feeler means attached to the load and means to automatically deploy said feeler means and said collapsible fin means when the load is pulled from an aircraft.

23. A rotary wing device including a body, rotor blades, means rotatably mounting said rotor blades on said body, said rotor blades being originally disposed in an inoperative position, means to retain said rotor blades in the inoperative position, means to inactivate said retaining means whereby said rotor blades move to an operative position, rudder means connected to said body to directionally stabilize said body, means to control said rudder means in accordance with directional changes in said body relative to its initial direction of glide, said control means including a gyroscope mounted on said body so as to be responsive to movements of said body, and said inactivating means causing actuation of said gyroscope.

24. A rotary wing device adapted to be dropped from an aircraft or the like for supporting a load dropped from the aircraft, said device including a body having the load supported therefrom in suspended relation thereto, rotor blades, means rotatably mounting said rotor blades on said body, said rotor blades being rotatable solely by movement of air flow over said blades, and means adapted to be attached to the load to control the plane of rotation of said blades when the load approaches the ground whereby the plane of rotation of said blades is changed, said control means including a single means responsive to movements of the load longitudinally and laterally relative to a straight vertical descent until the load contacts the ground, said single means tilting the plane of rotation of said blades in the longitudinal direction when the load moves in the longitudinal direction relative to the straight vertical descent to return the load to the straight vertical descent and tilting the plane of rotation of said blades in the lateral direction when the load moves in the lateral direction relative to the straight vertical descent to return the load to the straight vertical descent.

25. An aerial delivery device for supporting a load dropped from an aircraft, said device including a body, lift means mounted on said body to control the descent of said body, a cable connecting said body to the load within the aircraft from which said body is to be pulled, and means attaching said cable to said body at a point wherein a straight line connecting said attaching means and the center of aerodynamic forces acting on said device other than gravitational forces is above the center of gravity of said device when said body is deployed from the aircraft with its longitudinal axis inclined downwardly and with said lift means located downstream of said body and with the load still supported within the aircraft.

26. A rotary wing device for supporting a load dropped from an aircraft or the like, said device including a body, rotor blades, means rotatably mounting said rotor blades on said body, and means adapted to be attached to the load to control the plane of rotation of said blades when the load approaches the ground whereby the plane of rotation of said blades is changed, said control means including a single means responsive to movements of the load longitudinally and laterally relative to a straight vertical descent, said single means tilting the plane of rotation of said blades in the longitudinal direction when the load moves in the longitudinal direction relative to the straight vertical descent to return the load to the straight vertical descent and tilting the plane of rotation of said blades in the lateral direction when the load moves in the lateral direction relative to the straight vertical descent to return the load to the straight vertical descent, said rotatably mounting means includes a hub universally mounted on said body to support said blades, said single means comprises feeler means adapted to be universally mounted on the load, first means connecting said feeler means to said hub to transmit longitudinal movements of the load relative to the straight vertical descent to said hub to tilt the plane of rotation of said blades in the longitudinal direction and second means connecting said feeler means to said hub to transmit the lateral movements of the load relative to the straight vertical descent to said hub to tilt the plane of rotation of said blades in the lateral direction.

27. The device according to claim 2 including a support arm pivotally connected to said body and said rudder means is pivotally connected to said support arm.

28. A rotary wing device including a body, rotor blades, means rotatably mounting said rotor blades on said body, a support arm pivotally connected to said body, rudder means pivotally connected to said support arm to directionally stabilize said body, means to control said rudder means in accordance with directional changes in said body relative to its initial direction of glide, and said control means including a gyroscope rockably mounted on said support arm with its axis of rotation being parallel to the pivotal axis of said support arm when said gyroscope is positioned in the middle of its rockable travel, said gyroscope being responsive to movements of said body.

29. A rotary wing device including a body, rotary blades, means rotatably mounting said rotor blades on said body, a support arm pivotally connected to said body, rudder means pivotally connected to said support arm to directionally stabilize said body, means to control said rudder means in accordance with directional changes in said body relative to its initial direction of glide, and a collapsible fin connected to said body and to said support arm.

30. A rotary wing device including a body, rotor blades, means rotatably mounting said rotor blades on said body, rudder means connected to said body to directionally stabilize said body, means to control said rudder means in accordance with directional changes in said body relative to its initial direction of glide, said control means including a gyroscope mounted on said body so as to be responsive to movements of said body, and means to cause actuation of said gyroscope, said actuating means including a cable connected to said gyroscope and an aircraft from which said device is to be ejected whereby said cable exerts a force upon ejection of said device to cause actuation of said gyroscope.

References Cited

UNITED STATES PATENTS

| | | | |
|---|---|---|---|
| 2,776,017 | 1/1957 | Alexander. | |
| 2,873,075 | 2/1959 | Mooers et al. | 244—17.13 |
| 3,037,722 | 6/1962 | Gerstenberger et al. | 244—17.13 |
| 3,113,751 | 12/1963 | Cotton | 244—137 |
| 3,117,630 | 1/1964 | Barish | 244—17.11 X |
| 3,133,715 | 5/1964 | Grunfelder | 244—17.11 |
| 3,149,802 | 9/1964 | Wigal | 244—17.11 |
| 3,155,341 | 11/1964 | Girard | 244—17.19 X |
| 3,210,025 | 10/1965 | Lubben et al. | 244—1 |
| 3,211,235 | 10/1965 | Bretl | 244—17.19 X |
| 3,153,521 | 10/1964 | Laufer et al. | 244—17.11 |
| 3,327,969 | 6/1967 | Head | 244—7 |
| 2,526,451 | 10/1950 | Bensen | 244—138 |
| 2,775,202 | 12/1956 | Crockett | 244—79 X |
| 2,917,255 | 12/1959 | Boyd | 244—138 |
| 2,935,947 | 5/1960 | Jagiello | 244—79 X |
| 3,098,445 | 7/1963 | Jackson | 102—49 |
| 3,117,744 | 1/1964 | Roman | 244—138 X |
| 3,333,643 | 8/1967 | Girard | 244—138 X |

MILTON BUCHLER, Primary Examiner

THOMAS W. BUCKMAN, Assistant Examiner

U.S. Cl. X.R.

244—17.13, 79, 137

UNITED STATES PATENT OFFICE
CERTIFICATE OF CORRECTION

Patent No. 3,485,466 December 23, 1969

Richard H. Prewitt

It is certified that error appears in the above identified patent and that said Letters Patent are hereby corrected as shown below:

Column 2, line 24, "sid" should read -- side --; line 66, "wind" should read -- wing --. Column 5, line 52, "to", second occurrence, should read -- at --. Column 6, line 25, "lug", secon occurrence, should read -- lugs --; lines 55 and 59, "rubber", each occurrence, should read -- rudder --. Column 15, line 3, the comma (,), first occurrence, should read -- period (.) --; line 34, cancel the "period (.)"; line 35, after "path" insert a period (.). Column 17, line 73, "and" should read -- an --. Colum 18, line 64, "moutned" should read -- mounted --. Column 21, line 17, "rotary", second occurrence, should read -- rotor --.

Signed and sealed this 10th day of November 1970.

(SEAL)
Attest:

EDWARD M.FLETCHER,JR.
Attesting Officer

WILLIAM E. SHCUYLER, J
Commissioner of Patent